(12) United States Patent
Griesmeyer

(10) Patent No.: US 9,612,316 B1
(45) Date of Patent: Apr. 4, 2017

(54) CORRELATION AND 3D-TRACKING OF OBJECTS BY POINTING SENSORS

(71) Applicant: Sandia Corporation, Albuquerque, NM (US)

(72) Inventor: J. Michael Griesmeyer, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 384 days.

(21) Appl. No.: 14/448,513

(22) Filed: Jul. 31, 2014

(51) Int. Cl.
*G01S 3/02* (2006.01)
*G01S 5/02* (2010.01)

(52) U.S. Cl.
CPC .................................. *G01S 5/0294* (2013.01)

(58) Field of Classification Search
CPC ............. G01S 3/02; G01S 5/0294; G01S 5/02
USPC .................................................. 342/465, 418
See application file for complete search history.

(56) References Cited

U.S. PATENT DOCUMENTS

| 2008/0004994 | A1* | 1/2008 | Ainsworth | G01D 9/005 705/28 |
|---|---|---|---|---|
| 2012/0098704 | A1* | 4/2012 | Arnoult, Jr. | G01S 11/10 342/418 |
| 2013/0237811 | A1* | 9/2013 | Mihailescu | A61B 5/064 600/424 |
| 2015/0326968 | A1* | 11/2015 | Shigenaga | H04R 1/406 381/92 |

OTHER PUBLICATIONS

Blackman, S., "Multiple Hypothesis Tracking for Multiple Target Tracking," IEEE A&E systems Magazine, vol. 19, No. 1, pp. 5-18, 2004.
Bourgeois, F., and J.-C. Lassalle, "An Extension of the Munkres Algorithm for the Assignment Problem to Rectangular Matrices," Communications of the ACM, vol. 14, Dec. 1971, pp. 802-806.
Clemons, T. and Chang, K., "Effect of Sensor Bias on Space Based Bearing-only Tracker," Proceedings of SPIE, vol. 6968, No. 9, pp. 1-9, 2008.

(Continued)

*Primary Examiner* — Harry Liu
(74) *Attorney, Agent, or Firm* — Medley, Behrens & Lewis, LLC

(57) ABSTRACT

A method and system for tracking at least one object using a plurality of pointing sensors and a tracking system are disclosed herein. In a general embodiment, the tracking system is configured to receive a series of observation data relative to the at least one object over a time base for each of the plurality of pointing sensors. The observation data may include sensor position data, pointing vector data and observation error data. The tracking system may further determine a triangulation point using a magnitude of a shortest line connecting a line of sight value from each of the series of observation data from each of the plurality of sensors to the at least one object, and perform correlation processing on the observation data and triangulation point to determine if at least two of the plurality of sensors are tracking the same object. Observation data may also be branched, associated and pruned using new incoming observation data.

18 Claims, 5 Drawing Sheets

(56) References Cited

OTHER PUBLICATIONS

Danuser, G. and Stricker, M., (1998) "Parametric Model Fitting: From Inlier Characterization to Outlier Detection" IEEE Transactions on Pattern Analysis and Machine Intelligence 20, 2 p. 263.
Drummond, O. "On Track and Tracklet Fusion Filtering," Proceedings of SPIE, vol. 4728, pp. 176-195, 2002.
Hartley, Richard I., Sturm, Peter, Triangulation, Computer Vision and Image Understanding, vol. 68, No. 2, November, pp. 146-157, 1997.
Kerr, T., "Streamlining Measurement Iteration for EKF Target Tracking," IEEE Transactions on Aerospace and Electronic Systems, vol. 27, No. 2, pp. 408-421, 1991.
Press, William H., Flannery, Brian P., Teukolsky, Saul A., Vetterling, William T., Numerical Recipes in C. Cambridge University Press, pp. 305-323, 1988.
Schmidt, Ron L., "Combined Error at the Target", Feb. 2006.
Schmidt, (2006) Multi-Ball Geolocation.
Simonson, K., "Probabilistic Fusion of ATR Results", SAND98-1699, pp. 7-10.
Vallado, D. A., Fundamentals of Astrodynamics and Applications. pp. 720-733.

\* cited by examiner

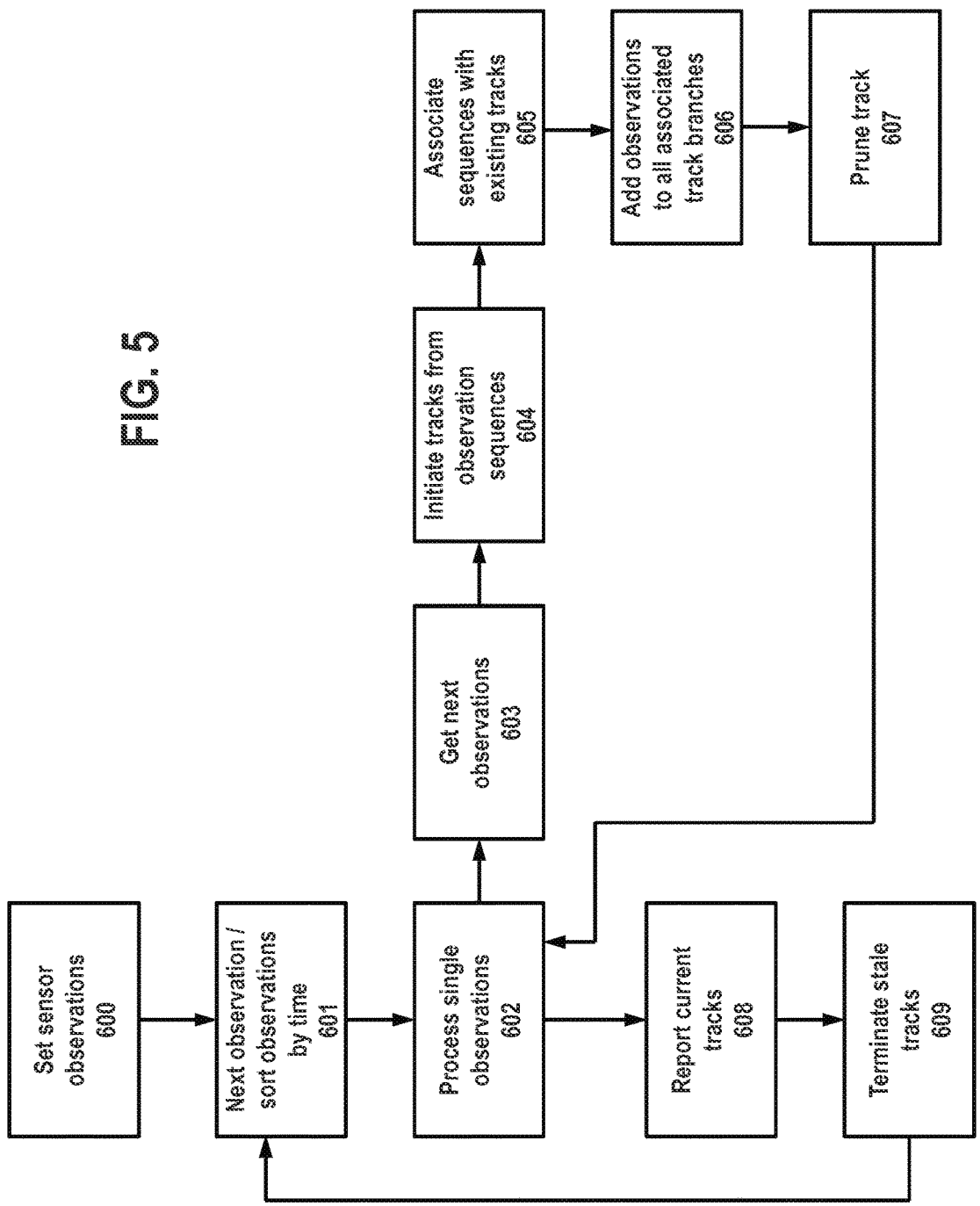

CORRELATION AND 3D-TRACKING OF OBJECTS BY POINTING SENSORS

GOVERNMENT INTEREST

This invention was developed under Contract DE-AC04-94AL85000 between Sandia Corporation and the U.S. Department of Energy. The U.S. Government has certain rights in this invention.

TECHNICAL FIELD

The present disclosure relates object tracking. More specifically, the present disclosure is directed to two-dimensional (2D) correlation and three-dimensional (3D) tracking of objects.

BACKGROUND

Object tracking is commonly used in satellite, aerospace and other applications (e.g., land, sea), where sensors are arranged to track one or more objects. When a plurality of sensors are used, pointing errors may often cause sensors to misalign in their line-of-sight (LOS), which in turn causes tracking errors, since the two sensors do not recognize they are pointing at the same object. During 3D tracking, this may further introduce velocity errors in a tracking system. Accordingly, there is a need in the art to provide more efficient and/or accurate 2D and 3D tracking.

SUMMARY

In view of the foregoing and other exemplary problems, drawbacks, and disadvantages of the conventional methods and structures, a robust, novel approach is disclosed for determining whether two pointing sensors are detecting the same object. As mentioned above, pointing errors cause the LOS from the sensors to miss each other even when pointing to the same object. Knowledge of sensor pointing errors provides an estimate of the miss distance distribution and a confidence that the sensors are detecting the same object. Weighted least squares triangulation may be used to estimate the position of the object and its standardized residual is used to estimate final confidence that the objects are the same.

For moving objects, observations can be used to estimate position and velocity. Triangulation points from fits of the observations from the individual sensors are used to update the tracks of moving objects. This significantly reduces the velocity errors of the resulting 3D track estimates. The correlation algorithm is deployed in a new system and in a tracking system being developed that uses the triangulation updates of tracks.

A robust, novel approach is also disclosed for determining whether two pointing sensors are detecting the same object. In addition, for moving objects, a 3D track is disclosed using triangulation of the pointing vectors from the different sensors. The correlation of observations from different pointing sensors depends on characterization of the pointing errors of the sensors and the fact that without pointing errors the lines of sight from the object to the sensors would intersect in the point that is the current location of the object.

In first order effects, the distribution of the miss-distance of pointing vectors from two sensors can be determined from the pointing errors of the sensors and is normally distributed. The realized miss-distance for a pair of observations can thus be used to assess the consistency with the hypothesis that the sensors are detecting the same object. Furthermore, if one wants to accept as correlated at least 95% of those that actually are correlated, then the pair of observations should be accepted as correlated if the miss-distance is less than the top 5% of miss-distances according to the estimated distribution.

If second order effects cannot be ignored or if refraction significantly bends the lines of sight, weighted least squares iteration for the triangulation point can be used starting with the estimated intersection point from the miss-distance calculation. The standardized residual from the least squares triangulation is normally distributed and thus can be used to assess whether the sensors are detecting the same object. Using pointing errors expected from the sensors of interest, the correlation confidence based on the normalized miss-distance and based on the standardized residual may be very close. The correlation cases that are relevant include both moving and nonmoving objects.

For pairs of non-moving objects, the correlation calculation in one embodiment is done for a single time point in the middle of the observation set overlap for the two sensors. Fits are used, if possible, to smooth out the random errors with fit errors and tighten the miss-distance distribution. For a moving object and a nonmoving object, there are three cases: non-mover before, during or after-mover. For the non-mover during the mover case, fits are used to obtain observations at a common time and assessment is the same as for two non-movers. For the non-mover before or after the mover a fit to the mover 2D track is used to extrapolate backward or forward to the time of the non-mover and the assessment is performed using the extrapolated point. For two moving targets that overlap in time, a time near the beginning and a time near the end of the overlap are used to assess correlation and the correlation confidences are fused to make the final assessment of correlation. When two movers do not overlap in time and the gap between them is not too large, correlation is assessed by extrapolating from one to the other both ways, assessing correlation confidence for both extrapolations and fusing them to make the final assessment of correlation.

A 3D tracker is also disclosed for combining 2D observations from multiple sensors into 3D tracks. First, 2D observation tracks from one sensor are correlated to 2D observation track from another sensor using the correlation algorithm described above for movers that overlap in time. Assessing the correlation of 2D tracks significantly reduces the computation load from that required to assess the correlation of individual observations from the sensor and allows smoothing of the observations sets, which can reduce the state vector errors for the resulting 3D track. A set of triangulation points are generated to initialize an Extended Kalman Filter based 3D track. After track initialization, the track can be extended by adding 2D observations one at a time or by adding additional triangulation points. It has been found that adding triangulation points instead of single 2D observations reduces the error in estimated object velocity because the random observation error has been replaced by fit error from the triangulation. This also tends to reduce the position error in the estimated 3D track.

Further scope of applicability of the present disclosure will become apparent from the detailed description given hereinafter. However, it should be understood that the detailed description and specific examples, while indicating preferred embodiments, are given by way of illustration only, since various changes and modifications within the spirit and scope of the invention will become apparent to those skilled in the art from this detailed description.

BRIEF DESCRIPTION OF THE FIGURES

The present disclosure will become more fully understood from the detailed description given herein below and the accompanying drawings which are given by way of illustration only, and thus, do not limit the present disclosure, and wherein:

FIG. 5 is an exemplary process for 3D fusion tracking under an exemplary embodiment.

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

DETAILED DESCRIPTION

Figure 1:
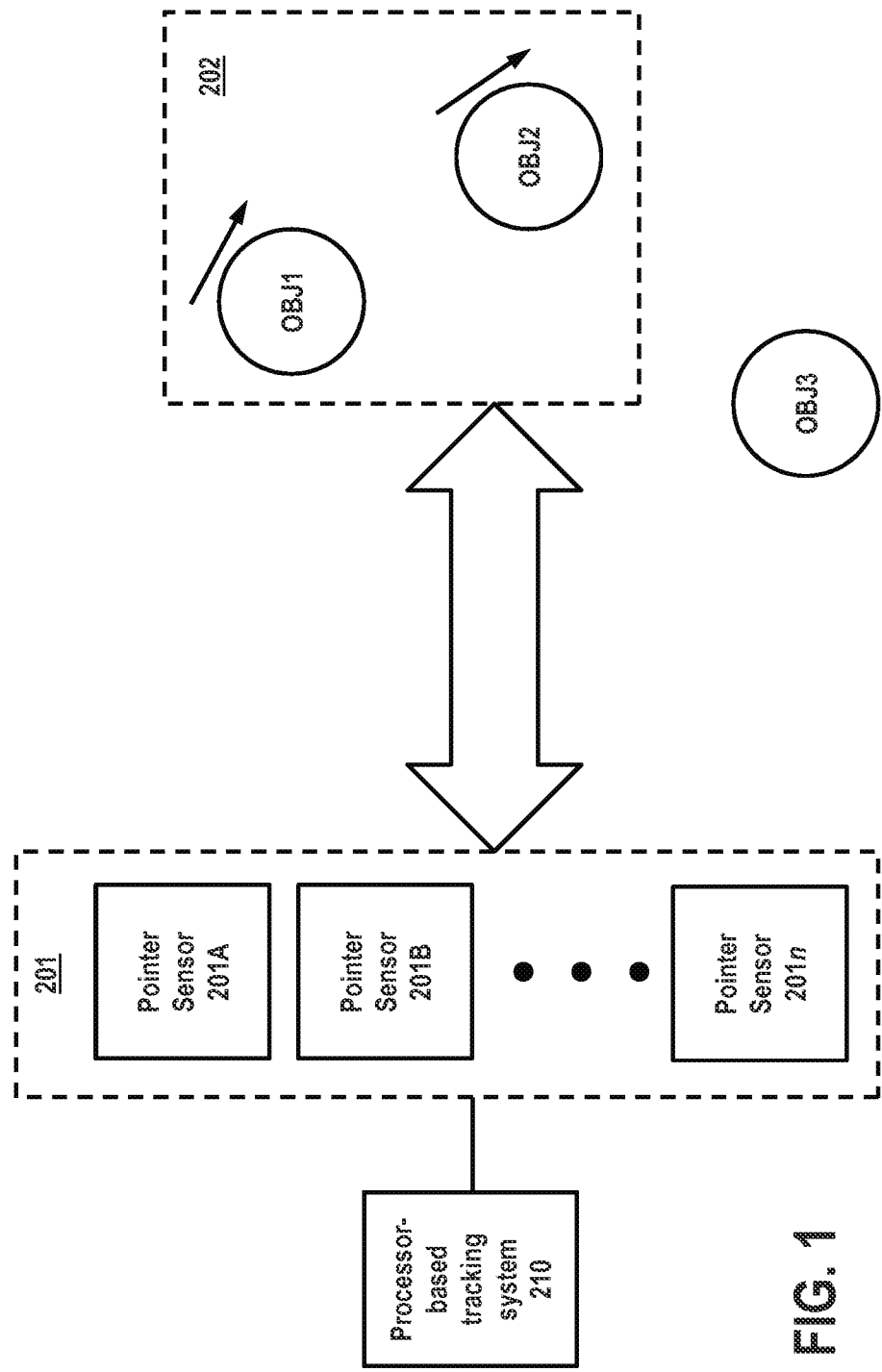
FIG. 1 illustrates an exemplary system for tracking objects using pointer sensors that are part of a processor-based tracking system.

Turning to FIG. 1, an exemplary embodiment is illustrated showing a plurality of pointer sensors (201A-201n) that may be incorporated in one or more sensor arrays 201 that may be part of a satellite-based, aeronautical-based, land and/or water-based system comprising a processor-based tracking system 210. The sensors of 201 in this example may be tasked with detecting objects (OBJ1-OBJ3) and tracking and/or correlating specific objects of interest 202 (OBJ1, OBJ2) any of which may be still and/or or moving in specific directions (illustrated by arrows in FIG. 1).

Correlation of Events Seen by Multiple Pointing Sensors

The processes for determining whether detections from separated pointing sensors are due to the same physical event are described below. Observation errors may lead to a statistical approach for assessing correlation, and different time bases for the sensors require methods to estimate observation data from each sensor at common time. The minimum distance between the pointing lines of sight from two sensors at the common time is used in a screening step. Candidate correlations that pass the screen are accessed using the standardized residuals from weighted least squares triangulation for the location of the event at the common time.

In one exemplary embodiment, for each target (object), the pointing sensors (e.g., 201A-201B) under consideration produce a series of observations each of which contains sensor position, pointing vector and observation error characterization at a specified time. If there were no observation errors, the line of sight from one sensor would intersect the line of sight from the other sensor at the target location for any specified time. The observation errors lead to a finite minimum distance between the lines of sight even if the sensors are pointing at the same target. Similarly, least squares triangulation using the sensor position and pointing vectors has non-zero residual errors because of the observation errors. Since the time base and observation frequency of the separate sensors are independent, appropriate techniques, depending on the particular case, should be selected to obtain observations at a common time to perform the correlation assessment.

The sections below disclose various aspects of operation, including component uncertainties that contribute to the observation error and how they are combined into final covariance matrix for the sensor pointing vectors, screening based on the minimum distance between lines of sight, correlation assessment by weighted least squares triangulation of the pointing vectors and the application of the algorithms to various cases of stationary and moving targets (objects) where the observation sets from the sensors overlap in time and where the observations are separated in time.

Uncertainties

Sources of uncertainty for the pointing sensors of interest are

Sensor position 3 dimensional error
Platform attitude 3 dimensional error
Instrument pointing 2 dimensional error
Centroiding 2 dimensional error
Distortion 2 dimensional error The position, attitude and instrument pointing error vary slowly compared to the duration of observations for a typical target and can be treated as bias errors. The centroiding and distortion errors tend to vary with each observation and can be treated as random errors. The 3D errors can be projected onto a plane perpendicular to the pointing vector to determine the effective 2D covariance matrices which then can be combined with the other 2D errors to calculate the total pointing error covariances. An advantageous representation of the pointing error covariance matrix under one embodiment is as a 2D ellipse, where the axes are the square roots of the eigenvalues of the covariance matrix (i.e. the standard deviations) and the orientation angle, $\theta$, is the rotation that diagonalizes the matrix. In the applications below it is assumed that component errors are independent and normally distributed. Bias errors may dominate for the sensors of interest.

When enough observations are available, numerical fits to the data are used to synthesize observations at a common time for correlation assessment. For interpolation cases where the observations from the sensors overlap in time small order polynomial fits are used and the resulting fit errors replace the random errors in the calculation of pointing error covariance. These fit errors follow a t-distribution rather than normal distribution under one embodiment. However, the t-distribution approaches the normal distribution if the number of fit points is large, and the normally distributed bias errors are dominant for the sensors of interest. This will be discussed further in the sections on applications to cases with temporally overlapping observations.

Kalman filters are used in one embodiment to predict an observation from one sensor at a time for which there is an observation from the other sensor when the sets of observations from the sensors do not overlap in time. In these cases, the Kalman estimation of the covariance matrix is used in place of the random error covariances in the calculation of total observation error covariance. This will be discussed further in the sections on applications to cases with temporally separated observations.

Screening Based on Lines of Sight Intersection Distance

Two different reported lines of sight for the same event would intersect if there were no measurement errors to form an epipolar plane that can be defined by the focal centers of the two sensors $v_j$ and $v_k$, and the location of the event (i.e., object), or triangulation point $T_{jk}$.

Measurement errors may cause the lines of sight not to intersect. Due to the two-axis configuration of many gimbaled sensor systems, pointing errors are often measured in two orthogonal angular directions about a computed pointing vector $p_i$ and expressed in terms of a zero-mean bivariate normal distribution about $p_i$. A confidence region associated with a bivariate normal distribution can be geometrically represented by an angular error ellipse centered at $v_i$ having normal $p_i$. The following discussion assumes that atmospheric refraction can be ignored so that the pointing vector reported for a sensor observation of an event represents a straight line of sight. A later section will discuss some approaches for dealing with the bending of the light path due to refraction.

Minimum Distance Between Lines of Sight

Given measurement errors and assuming the lines of sight are not parallel, there will be a single shortest line connecting them. A closed form solution for that line exits and a selected point on the line will be used to initialize the full least squares determination of the intersection point.

For purposes of explanation, it is assumed that all vectors in the following discussion are expressed in a common coordinate system unless otherwise specified. Consider n>1 satellite (or spacecraft, or any suitable vehicle, craft or device utilizing tracking) each having a sensor viewing a potential common target. Further let $v_i$, i=0 . . . n-1, be the Cartesian coordinates of the focal center of each of the respective sensors and $p_i$, i=0 . . . n-1, the unit pointing vectors to the target from each of the respective satellites. There are $2^n-1$ pairs of sensors. The following considers only single pairs.

Two unique points may be determined, one on each of the three-space lines emanating from $v_j$ and $v_k$, 0<=j<k<n, along the pointing vectors $p_j$ and $p_k$ respectively such that the distance between these points is a minimum. It should be noted that the line joining these two unique points is perpendicular to both of $p_j$ and $p_k$. Thus, it suffices to find positive real values $t_j$ and $t_k$ such that $$(v_j + t_j p_j - v_k - t_k p_k) \cdot p_j = 0$$

and $$(v_j + t_j p_j - v_k - t_k p_k) \cdot p_k = 0$$

where • is three-dimensional dot (vector) product.

Expanding, $$v_j \cdot p_j + t_j p_j \cdot p_j - v_k \cdot p_j - t_k p_k \cdot p_j = 0$$

and $$v_j \cdot p_k + t_j p_j \cdot p_k - v_k \cdot p_k - t_k p_k \cdot p_k = 0.$$

Taking advantage of the fact that the $p_i$ are unit vectors $$v_j \cdot p_j + t_j - v_k \cdot p_j - t_k p_k \cdot p_j = 0$$

and $$v_j \cdot p_k + t_j p_j \cdot p_k - v_k \cdot p_k - t_k = 0$$

so that $$t_j = v_k \cdot p_j + t_k p_k \cdot p_j - v_j \cdot p_j = p_j \cdot (v_k + t_k p_k - v_j)$$

and $$v_j \cdot p_k + p_j \cdot (v_k + t_k p_k - v_j) p_j \cdot p_k - v_k \cdot p_k - t_k = 0.$$

Solving, $$t_k((p_j \cdot p_k)^2 - 1) = (v_j \cdot p_j)(p_j \cdot p_k) + v_k \cdot p_k - v_j \cdot p_k - (v_k \cdot p_j)(p_k \cdot p_j)$$

results in $$t_k = \frac{(p_j \cdot p_k)(p_j \cdot (v_j - v_k)) + p_k \cdot (v_k - v_j)}{(p_j \cdot p_k)^2 - 1}$$

Note, $p_j \cdot p_k$ cannot be unity if $v_j$ and $v_k$ are distinct and $p_j$ and $p_k$ are pointing at the same target. The vector with minimum magnitude connecting lines of sight j and k is $$M_{jk} = v_k + t_k p_k - v_j - t_j p_j, j \neq k$$

Error analysis

Let $D_{jk}$ be magnitude of shortest line connecting the lines of sight, $M_{jk}$. If the two lines of sight do indeed intersect, the magnitude should be 0. Thus, $D_{jk}$ is a measure of the error parallel to $M_{jk}$ and thus perpendicular to the epipolar plane.

Now, suppose that an elliptic error cone, $eec_i$, in terms of an origin at $v_i$ and angular error ellipse $e_i$, $(a_i, b_i, \theta_i)$ can be determined for each pointing vector $p_i$, i=0, . . . ,n-1. Here, $a_i$ is the standard deviation in the major along the major axis, $b_i$ is the standard deviation minor axis and $\theta_i$ is the orientation angle of the major axis. Consider pair-wise distinct pointing vectors $p_j$ and $p_k$, with scalars $t_j$ and $t_k$ defined as above. Then, an error ellipse corresponding to $p_j$ can be obtained by intersecting the elliptic error cone $eec_j$ with a plane located a distance $t_j$ (in the direction of $p_j$) from the satellite and normal to $p_j$. Similarly, define an error ellipse corresponding to $p_k$. The convenient error axes for analyzing the j and k lines of sight are the normal to the epipolar plane, and a normal to $p_j$ in the epipolar plane for j and the normal to the epipolar plane, and a normal to $p_k$ in the epipolar plane for k. In the following, these will be denoted by the vj, hj, vk and hk subscripts respectively. Let $\gamma_{aj}$ and $\gamma_{bj}$ be the angular errors along the major and minor axis of $e_j$ and $\gamma_{ak}$ and $\gamma_{bk}$ be the angular errors along the major and minor axis of $e_k$. Define $\gamma_{vj}$ as the projection of the angular errors $\gamma_{aj}$ and $\gamma_{bj}$ onto the normal to the epipolar plane and $\gamma_{hj}$ as the projection of the angular errors $\gamma_{aj}$ and $\gamma_{bj}$ onto the epipolar plane. Similarly define $\gamma_{vk}$ and $\gamma_{hk}$. Thus:

$$\gamma_{vj} = \gamma_{aj} \cos \theta_{jk} + \gamma_{bj} \sin \theta_{jk}$$

$$\gamma_{hj} = \gamma_{aj} \sin \theta_{jk} + \gamma_{bj} \cos \theta_{jk}$$

$$\gamma_{vk} = \gamma_{ak} \cos \theta_{kj} + \gamma_{bk} \sin \theta_{kj}$$

$$\gamma_{hk} = \gamma_{ak} \sin \theta_{kj} + \gamma_{bk} \cos \theta_{kj}$$

where $\theta_{jk}$ is the angle between the normal to the epipolar plane and the major axis of $e_j$ and $\theta_{kj}$ is the angle between the normal to the epipolar plane and the major axis of $e_k$.

Figure 2:
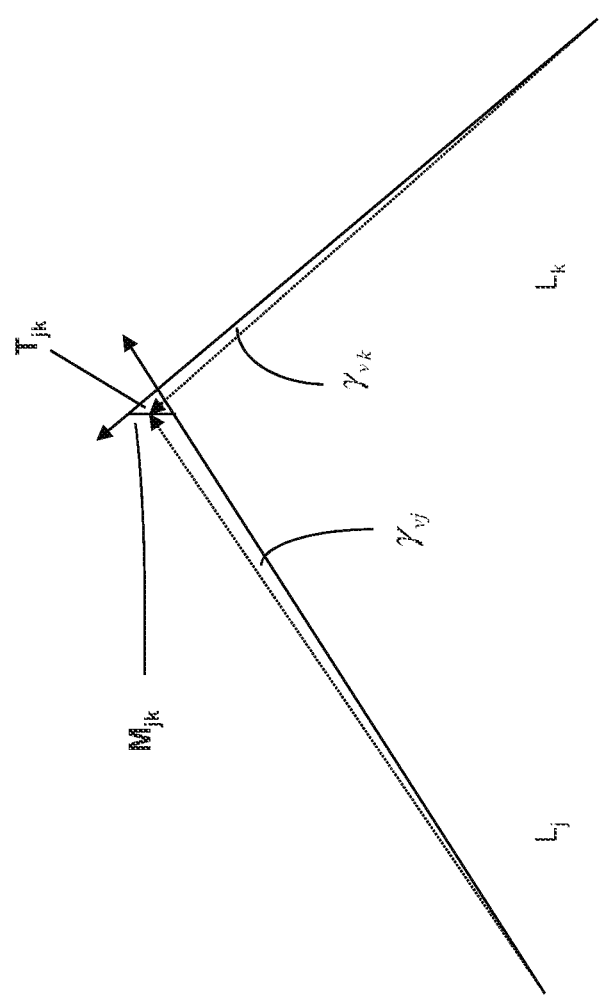
FIG. 2 illustrates an embodiment of small angle approximation for angular errors perpendicular to the epipolar plane via a line of sight and triangulation point.

Turning to FIG. 2, it can be appreciated by those skilled in the art that using the small angle approximation for angular errors perpendicular to the epipolar plane $\gamma_{vj}$ and $\gamma_{vk}$, the magnitude of $M_{jk}$ in is $$D_{jk} = |t_j \gamma_{vj} - t_k \gamma_{vk}|,$$

where, as before, $t_j$ and $t_k$ are the ranges from the sensor to the shortest line connecting lines of sight $L_j$ and $L_k$.

As is discussed in greater detail below in connection with "Second Order LOS Intersection Distance Errors", when the second order terms are small $$\left(i.e. \frac{\gamma_{hj}}{\sin\varphi_{jk}} \ll 1 \text{ and } \frac{\gamma_{hk}}{\sin\varphi_{jk}} \ll 1\right)$$

the expression for $D_{jk}$ becomes:

$$D_{jk} = |\gamma^T E| = |t_{jA}\gamma_{aj} \cos\theta_{jk} + t_{jA}\gamma_{bj} \sin\theta_{jk} - t_{kA}\gamma_{ak} \cos\theta_{kj} + t_{kA}\gamma_{bk} \sin\theta_{kj}| = |t_{jA}\gamma_{vj} - t_{kA}\gamma_{vk}|$$

where $$\gamma^T = [\gamma_{aj}, \gamma_{bj}, \gamma_{ak}, \gamma_{bk}],$$

$$E^T = [t_{jA} \cos\theta_{jk}, t_{jA} \sin\theta_{jk}, t_{kA} \cos\theta_{kj}, t_{kA} \sin\theta_{kj}],$$

$t_{jA}$ and $t_{kA}$ are the actual ranges from the sensors to the target. Thus, to first order, only errors perpendicular to the epipolar plane contribute to $D_{jk}$.

Initial Estimate of Triangulation Point for Two Pointing Sensors

The best estimate of the triangulation point, given the measured $D_{jk}$, would minimize the sum of their weighted square residual errors under one exemplary embodiment. The quantity to be minimized may be:

$$\sum_{e^2} = \gamma^T C^{-1} \gamma$$

where $\gamma$ is the vector of angular errors and $C$ is their covariance matrix.

Using only first order errors is equivalent to assuming that the triangulation point lies along somewhere on the shortest line between the lines of sight. This removal of the coupling between the errors in the epipolar plane and those perpendicular to it allows a simple least squares approach to generate an initial triangulation point for input to the full weighted least squares procedure described below, which takes the second order effects into account.

Assuming $\gamma_{vj}$ and $\gamma_{vk}$ are independent, the quantity to be minimized is now:

$$\sum_{e^2} = \left(\frac{\gamma_{vj}}{\rho_{vj}}\right)^2 + \left(\frac{\gamma_{vk}}{\rho_{vk}}\right)^2$$

where $$\rho_{vj}^2 = (a_j \cos\theta_{jk})^2 + (b_j \sin\theta_{jk})^2 \text{ and } \rho_{vk}^2 = (a_k \cos\theta_{kj})^2 + (b_k \sin\theta_{kj})^2$$

Assuming that measurements have provided $v_j$, $v_k$, $p_j$ and $p_k$, as well as estimates of the error ellipses $e_j$ and $e_k$, then, estimates of $D_{jk}$, $t_{jA}$, $t_{kA}$, $\rho_{vj}$ and $\rho_{vk}$ can be generated. These may be used to calculate values of $\gamma_{vj}$ and $\gamma_{vk}$ that minimize the weighted square angular errors for the estimated distance error $D_{jk}$.

To first order errors $$\gamma_{vk} = \frac{-D_{jk} + t_{jA}\gamma_{vj}}{t_{kA}}$$

giving $$\sum_{e^2} = \gamma_{vj}^2 \left(\frac{1}{\rho_{vj}^2} + \frac{t_{jA}^2}{t_{kA}^2 \rho_{vk}^2}\right) - \gamma_{vk}\left(\frac{2t_{jA}D_{jk}}{t_{kA}^2 \rho_{ka}^2}\right) + \frac{D_{jk}^2}{t_{kA}^2 \rho_{vk}^2}$$

setting $$\frac{d\sum_{e^2}}{d\gamma_{vj}} = 2\gamma_{vj}\left(\frac{1}{\rho_{vj}^2} + \frac{t_{jA}^2}{t_{kA}^2 \rho_{vk}^2}\right) - \frac{2t_{jA}D_{jk}}{t_{kA}^2 \rho_{vk}^2} = 0$$

gives $$\gamma_{vj} = \frac{t_{jA}\rho_{vj}^2 D_{jk}}{t_{jA}^2 \rho_{vj}^2 + t_{kA}^2 \rho_{vk}^2}$$

$$\gamma_{vk} = \frac{-t_{kA}\rho_{vk}^2 D_{jk}}{t_{jA}^2 \rho_{vj}^2 + t_{kA}^2 \rho_{vk}^2}.$$

Defining $$\sigma_{vj} = t_{jA}\rho_{vj}$$

$$\sigma_{vk} = t_{kA}\rho_{vk}$$

and $$\sigma_{vjk} = \sqrt{\sigma_{vj}^2 + \sigma_{vk}^2}$$

gives $$t_{jA}\gamma_{vj} = \frac{\sigma_{vj}^2 D_{jk}}{\sigma_{vj}^2 + \sigma_{vk}^2} = \frac{\sigma_{vj}^2 D_{jk}}{\sigma_{vjk}^2}.$$

$$t_{kA}\gamma_{vk} = \frac{\sigma_{vk}^2 D_{jk}}{\sigma_{vj}^2 + \sigma_{vk}^2} = -\frac{\sigma_{vk}^2 D_{jk}}{\sigma_{vjk}^2}$$

The initial estimate of the triangulation point based on sensors j and k is $$T_{jk} = v_j + t_{jA}p_j + \frac{M_{jk}}{D_{jk}} t_{jA}\gamma_{vj}$$

Correlation Screening Using Minimum Distance

The closed form solution for $D_{jk}$ in terms of $v_j$, $v_k$, $p_j$ and $p_k$, together with estimates of $\rho_{vj}$ and $\rho_{vk}$ allow a screening statistical test of whether the error normal to the epipolar plane is consistent with the intersection of $L_j$ and $L_k$ (i.e. they are pointing to the same event). Recall that to first order errors, $$D_{jk} = |t_{jA}\gamma_{vj} - t_{kA}\gamma_{vk}|$$

Let $N(\mu,\sigma^2)$ be the normal distribution with mean $\mu$ and standard deviation $\sigma$. Then since $\gamma_{vj}$ and $\gamma_{vk}$ are from different sensors, they are assumed to be independent. This leads to $$t_{jA}\gamma_{vj} - t_{kA}\gamma_{vk} \sim N(0, \sigma_{vj}^2 + \sigma_{vk}^2) = N(0, \sigma_{vjk}^2)$$

Thus, the normalized minimum distance between the lines of sight $$nD_{jk} = D_{jk}/\sigma_{vjk} \sim |N(0,1)|$$

provides a statistic for estimating the confidence that particular measured $D_{jk}$ from intersection of $L_j$ and $L_k$ is consistent with the hypothesis that two observations from different sensors are from the same event.

The confidence that $nD_{jk}$ is consistent with correlation of the two observations $$Conf = 1 - P(x \le nD_{jk}) = 1 - erf(nD_{jk}/\sqrt{2})$$

where x is the random variable for the normalized minimum distance between lines of sight and $erf(s/\sqrt{2})$ is the cumulative probability for the absolute value of a normally distributed variable, s. For example, 5% confidence implies that 95% of the time actually correlated observations would have a normalized minimum distance between the lines of sight less than or equal to the observed $nD_{jk}$.

The final assessment under one embodiment of whether of the $L_j$ and $L_k$ point to the same event must still wait until the full least squares procedure is completed because the pointing errors in the epipolar plane have not yet been taken into account and nor have possible refraction effects which bend the line of sight violating the straight line assumption of the minimum intersection distance calculation. Here, the confidence is set lower than the desired confidence cutoff because the minimum distance calculation is used as a screen to determine whether to perform the least squares triangulation that is employed to perform the final assessment of correlation. The screening calculation also provides an estimate of the triangulation point to initialize the least squares calculation, and estimates of parameters such as range from target to sensors that are used in refining some calculations.

Assessment Based on Triangulation Standardized Residuals

Weighted least squares approaches are particularly advantageous in multiple-image data point triangulation. In this section, a summary of the weighted least squares formulation is provided below followed application to the triangulation points for multiple sensors seeing the same event.

Exemplary Formulation

In one exemplary embodiment, assume $$l = \tilde{l} + e,$$

where l is a vector of n unperturbed observations, e is a vector of a priori unknown residuals and the actual observations $\tilde{l}$ are normally distributed with $$\tilde{l} \sim N(l, \Sigma_{ll}),$$

where $\bar{l}$ is the mean of the distribution and $\Sigma_{ll}$ denotes the covariance matrix. Letting x be a vector of u model parameters, the maximum likelihood estimators for model parameters are found by solving the nonlinear equality constrained problem $$\text{minimize}[\Theta = e^T Q_{ll}^{-1} e] \text{ subject to } f(x,l) = 0.$$

where $Q_{ll}$ is the cofactor matrix found from a normalization $\Sigma_{ll} = \sigma_0^2 Q_{ll}$, $\sigma_0^2$ is the a priori standard deviation of a unit weight observation. The inverted cofactor matrix can be interpreted as a weight matrix. Linearization of the problem allows an iterative solution given an initial guess of the model parameters $\hat{x}(0)$ and with a first estimate $\hat{l}(0) = \tilde{l}$ for the unperturbed observations. The iteration is stopped if the improvement $\hat{\Delta}x(s) = \hat{x}(s+1) - \hat{x}(s)$ at step s is smaller than a specified threshold. The estimates for the unperturbed observations are updated at each step by $\hat{\Delta}l(s) = \hat{l}(s+1) - \hat{l}(s)$. When stopping the iteration at step $s^*$, the final estimates of the unknowns are $\hat{l}(s^*+1)$ and $\hat{x}(s^*+1)$. A final estimate for the residuals e is obtained through $e = \hat{l}(s^*+1) - \tilde{l}$.

The linearized form of the constraint functions is $$A\Delta x + B\Delta l + w = 0,$$

where $A = \partial f/\partial x$ is an r×u matrix and $B = \partial f/\partial l$ is an r×n and $w = -f(\hat{x}(s), \hat{l}(s))$ is a vector of r function residuals.

The solutions for $\hat{\Delta}x$ and $\hat{\Delta}l$ are $$\hat{\Delta}l = (A^T Q_{ww}^{-1} A)^{-1} A^T Q_{ww}^{-1} w,$$

and $$\hat{\Delta}x = Q_{ll} B^T Q_{ww}^{-1} (-A(A^T Q_{ww}^{-1} A)^{-1} A^T Q_{ww}^{-1}) w,$$

where $Q_{ww} = B Q_{ll} B^T$ simplifies the notation and can be interpreted as the cofactor matrix of the function residuals. The cofactors $Q_{ww}$ can be converted to covariances $\Sigma_{ww}$ by multiplying $Q_{ww}$ with $$\hat{\sigma}_0^2 = \frac{\hat{e}^T Q_{ll}^{-1} \hat{e}}{v},$$

where v is the number of degrees of freedom of the estimation problem. If the data and the model agree, $\hat{\sigma}_0^2$ is an unbiased estimator of $\sigma_0^2$. Note that multiplying $Q_{ww}$ with $\sigma_0^2$ instead of $\hat{\sigma}_0^2$ results in a priori covariances. Thus, the solutions for $\hat{\Delta}x$ and $\hat{\Delta}l$ can be written $$\hat{\Delta}x = (A^T \Sigma_{ww}^{-1} A)^{-1} A^T \Sigma_{ww}^{-1} w,$$

and $$\hat{\Delta}l = \Sigma_{ll} B^T \Sigma_{ww}^{-1} (-A(A^T \Sigma_{ww}^{-1} A)^{-1} A^T \Sigma_{ww}^{-1}) w,$$

where $\Sigma_{ww} = B \Sigma_{ll} B^T$ again simplifies the notation and can be interpreted as the a priori covariance matrix of the function residuals. In practice, $\hat{l}(s+1)$ can often be calculated from a sensor model using the new value $\hat{x}(s+1)$ removing the need to use the approximate $\hat{\Delta}l$ above.

Propagation of the cofactors of the function residuals into the spaces of the unknowns yields:

$$Q_{\hat{\Delta}x\hat{\Delta}x} = (A^T Q_{ww}^{-1} A)^{-1} = (A^T (B Q_{ll} B^T)^{-1} A)^{-1},$$

and $$Q_{\hat{\Delta}l\hat{\Delta}l} = Q_{ll} B^T Q_{ww}^{-1} B Q_{ll} - Q_{ll} B^T Q_{ww}^{-1} A (A^T Q_{ww}^{-1} A)^{-1} A^T Q_{ww}^{-1} B Q_{ll}.$$

Now $$Q_{\hat{x}\hat{x}} \approx Q_{\hat{\Delta}x\hat{\Delta}x} \text{ and } Q_{\hat{e}\hat{e}} \approx Q_{\hat{\Delta}l\hat{\Delta}l}.$$

The covariances are obtained by multiplying by $\sigma_0^2$ or $\hat{\sigma}_0^2$. So the a priori covariances are $$\sum_{\hat{x}\hat{x}} = \left(A^T \sum_{ww}^{-1} A\right)^{-1} = \left(A^T \left(B \sum_{ll} B^T\right)^{-1} A\right)^{-1},$$

and $$\sum_{\hat{e}\hat{e}} = \sum_{ll} B^T \sum_{ww}^{-1} B \sum_{ll} - \sum_{ll} B^T \sum_{ww}^{-1} A \left( A^T \sum_{ww}^{-1} A \right)^{-1} A^T \sum_{ww}^{-1} B \sum_{ll},$$

$$\sum_{\hat{e}\hat{e}} = \sum_{ll} B^T \sum_{ww}^{-1} B \sum_{ll} - \sum_{ll} B^T \sum_{ww}^{-1} A \sum_{\hat{x}\hat{x}} A^T \sum_{ww}^{-1} B \sum_{ll}.$$

The standardized residual for use in test statistics is $$\overline{e}_i = \frac{\hat{e}_i}{\sqrt{\sum_{\hat{e}\hat{e}ii}}} \sim N(0, 1).$$

where $$\sum_{\hat{e}\hat{e}ii}$$

is the $i^{th}$ diagonal element of $$\sum_{\hat{e}\hat{e}}.$$

It is common to assume that the standardized residuals are distributed normally. However, this assumption should be tested for the particular applications.

Application to Events Seen by Multiple Pointing Sensors

In this embodiment, the data associated with a line of sight $L_i$ are $v_i$, $p_i$, and $e_i$. The error ellipse is expressed in terms of major axis $a_i$, minor axis $b_i$, and orientation angle $\theta_i$. This allows a simple formulation of the weighted least square approach to find the triangulation point (x≡T) in terms of these measurements that for m sensors minimizes $$\Theta = e^T Q_{ll}^{-1} e = \sigma_0^2 e^T \sum_{ll}^{-1} e = \sigma_0^2 \sum_i \left( \left( \frac{\gamma_{ai}}{a_i} \right)^2 + \left( \frac{\gamma_{bi}}{b_i} \right)^2 \right)$$

where $\gamma_{ai}$ is the angular error in the $a_i$ direction for sensor i, $\gamma_{bi}$ is the angular error in the $b_i$ direction for sensor i and $$\sum_{ll} = \begin{bmatrix} a_1^2 & 0 & \ldots & 0 & 0 \\ 0 & b_1^2 & \ldots & 0 & 0 \\ \ldots & \ldots & \ldots & \ldots & \ldots \\ 0 & 0 & \ldots & a_m^2 & 0 \\ 0 & 0 & \ldots & 0 & b_m^2 \end{bmatrix}$$

is the 2m×2m covariance matrix. Then there are two condition equations for each sensor:

$$F_{ai} = \gamma_{ai} - g_{ai}(v_i, p_i, e_i, T) = 0$$

$$F_{bi} = \gamma_{bi} - g_{bi}(v_i, p_i, e_i, T) = 0$$

where $g_{ai}$ calculates $\gamma_{ai}$ using $v_i$, $p_i$, $e_i$ and the estimate of T, and $g_{bi}$ calculates $\gamma_{ai}$ using $v_i$, $p_i$, $e_i$ and the estimate of T.

Now $$p_i - \tilde{p}_i = \hat{\gamma}_{ai} u_{ai} + \hat{\gamma}_{bi} u_{bi}$$

where $u_{ai}$ and $u_{bi}$ are the unit vectors in the directions of the $a_i$ and $b_i$ axes of $e_i$. So the condition functions can be written as $$g_{ai}(v_i, p_i, e_i, T) = g_{ai}(v_i, \tilde{p}_i, \gamma_{ai}, \gamma_{bi}, e_i, T)$$

$$g_{bi}(v_i, p_i, e_i, T) = g_{bi}(v_i, \tilde{p}_i, \gamma_{ai}, \gamma_{bi}, e_i, T)$$

leading to the identification $$l \equiv \begin{bmatrix} \gamma_{a1} \\ \gamma_{b1} \\ \vdots \\ \vdots \\ \gamma_{am} \\ \gamma_{bm} \end{bmatrix}$$

and $$B = \frac{\partial f}{\partial l} = \begin{bmatrix} \frac{\partial f_1}{\partial l_1} & \ldots & 0 \\ \ldots & \ldots & \ldots \\ 0 & \ldots & \frac{\partial f_m}{\partial l_m} \end{bmatrix}$$

where $$\frac{\partial f_i}{\partial l_i} = \begin{bmatrix} \frac{\partial g_{ai}}{\partial \gamma_{ai}} & \frac{\partial g_{ai}}{\partial \gamma_{bi}} \\ \frac{\partial g_{bi}}{\partial \gamma_{ai}} & \frac{\partial g_{bi}}{\partial \gamma_{bi}} \end{bmatrix}.$$

Since $g_{ai}$ alculates the current $\gamma_{ai}$ and $g_{bi}$ calculates the current $\gamma_{bi}$, which are assumed to be independent errors, $\partial f_i/\partial l_i$ should be the identity matrix $$\frac{\partial f_i}{\partial l_i} \approx \begin{bmatrix} 1 & 0 \\ 0 & 1 \end{bmatrix}.$$

Now x≡T so $$A = \frac{\partial f}{\partial x} = \begin{bmatrix} \frac{\partial g_{a1}}{\partial T_x} & \frac{\partial g_{a1}}{\partial T_y} & \frac{\partial g_{a1}}{\partial T_z} \\ \frac{\partial g_{b1}}{\partial T_x} & \frac{\partial g_{b1}}{\partial T_y} & \frac{\partial g_{b1}}{\partial T_z} \\ \vdots & \vdots & \vdots \\ \vdots & \vdots & \vdots \\ \frac{\partial g_{am}}{\partial T_x} & \frac{\partial g_{am}}{\partial T_y} & \frac{\partial g_{am}}{\partial T_z} \\ \frac{\partial g_{bm}}{\partial T_x} & \frac{\partial g_{bm}}{\partial T_y} & \frac{\partial g_{bm}}{\partial T_z} \end{bmatrix}$$

Finally $$w = -f = \begin{bmatrix} -F_{a1} \\ -F_{b1} \\ \vdots \\ \vdots \\ -F_{am} \\ -F_{bm} \end{bmatrix}.$$

At each iteration step, the current value of $p_i$ and the new value of T are used to calculate $\gamma_{ai}$ and $\gamma_{bi}$. The angle between the new and previous $p_i$ is the current angular error and is projected onto the $a_i$ and $b_i$ axes of the error ellipse to obtain $\gamma_{ai}$ and $\gamma_{bi}$. The new pointing vector can be found from $$\hat{T}(s+1) = v_i + \hat{t}(s+1)\hat{p}_i(s+1)$$

giving $$\hat{p}_i(s+1) = \frac{\hat{T}(s+1) - v_i}{\hat{t}(s+1)} = \frac{\hat{T}(s+1) - v_i}{|\hat{T}(s+1) - v_i|}$$

Now $$\hat{p}_i(s+1) \cdot \hat{p}_i(s) = \cos \hat{\gamma}_i(s+1)$$

$$\hat{\gamma}_i(s+1) = \cos^{-1}(\hat{p}_i(s+1) \cdot \hat{p}_i(s))$$

where $\hat{\gamma}_i$ is an estimate of the angular error for the current $\hat{T}$. Define $$\hat{u}_{yi}(s+1) = \frac{\hat{p}_i(s+1) - \hat{p}_i(s)}{|\hat{p}_i(s+1) - \hat{p}_i(s)|}$$

$$\hat{\rho}_i(s+1) = \cos^{-1}(\hat{u}_{yi}(s+1) \cdot u_{ai})$$

where $\hat{u}_{yi}$ is the unit vector in the direction of $\hat{\gamma}_i$, $u_{ai}$ is the unit vector in the direction of major axis of the error ellipse $e_i$ and $\hat{\rho}_i$ is the angle between $\hat{\gamma}_i$ and the major axis of the error ellipse. Then $$F_{ai}(s+1) = \hat{\gamma}_{ai}(s+1) = \hat{\gamma}_i(s+1)\cos \rho_i(s+1)$$

$$F_{bi}(s+1) = \hat{\gamma}_{bi}(s+1) = \hat{\gamma}_i(s+1)\sin \rho_i(s+1)$$

Recalling that, after the final iteration, the final residuals are $$e = \hat{l}(s^*+1) - \tilde{l}.$$

As before $$\hat{p}_i(s^*+1) \cdot \tilde{p}_i = \cos \gamma'_{i,i}$$

$$\gamma'_{i,i} = \cos^{-1}(\hat{p}_i(s^*+1) \cdot \tilde{p}_i)$$

where $\gamma'_{i,i}$ is an estimate of the angular error for the final estimate of the triangulation point $\tilde{T}$. Define $$(u')_{yi} = \frac{\hat{p}_i(s^*+1) - \tilde{p}_i}{|\hat{p}_i(s^*+1) - \tilde{p}_i|}$$

$$\rho' = \cos^{-1}((u')_{yi} \cdot u_{ai})$$

where $\gamma'_{i,yi}$ is the unit vector in the direction of $\gamma'_{i,i}$, and $\rho'_{i,i}$ is the angle between $\gamma'_{i,i}$ and the major axis of the error ellipse. Then $$\gamma'_{i,ai} = \gamma'_{i,i} \cos \rho'_{i,i}$$

$$\gamma'_{i,bi} = \gamma'_{i,i} \sin \rho'_{i,i}$$

The standardized residuals are $$\bar{\gamma}_{ai} = \frac{\gamma'_{ai}}{\sqrt{\sum_{\tilde{e}\tilde{e}ai}}} \sim N(0, 1)$$

$$\bar{\gamma}_{bi} = \frac{\gamma'_{bi}}{\sqrt{\sum_{\tilde{e}\tilde{e}bi}}} \sim N(0, 1).$$

Simulations are used to verify that these standardized residuals are indeed normally distributed for the cases of interest.

Note, if B is the identity matrix, then $$\sum_{ww} \sum_{ll},$$

$$\sum_{\hat{x}\hat{x}} = \left(A^T \sum_{ww}^{-1} A\right)^{-1} = \left(A^T \sum_{ll}^{-1} A\right)^{-1},$$

$$\sum_{\tilde{e}\tilde{e}} = \sum_{ll} - A\left(A^T \sum_{ll}^{-1} A\right)^{-1} A^T,$$

$$\sum_{\tilde{e}\tilde{e}} = \sum_{ll} - A \sum_{\hat{x}\hat{x}} A^T.$$

Correlation Assessment Based on Least Squares Statistics

Once the best triangulation point is found through iteration, the assessment of whether events seen by more than one sensor are the same event can be made. If the standardized residuals from triangulation are too large the lines of sight must not be from the same target. The assumption of normally distributed standardized residual leads to the same confidence calculation for the standardized residuals $\bar{\gamma}_{xi}$ as is used for the normalized minimum distance between the lines of sight:

$$Conf = 1 - P(x \leq \bar{\gamma}_{xi}) = 1 - erf(\bar{\gamma}_{xi}/\sqrt{2})$$

In practice, when observations from just two sensors are used, the least squares procedure results in all four standardized residuals ($\bar{\gamma}_{a1}, \bar{\gamma}_{b1}, \bar{\gamma}_{a2}, \bar{\gamma}_{b2}$) being equal. The confidence level required for a determination of correlation depends upon application needs but is typically set to 5%.

When the target density is high, the line of sight for a target on one sensor may be close to the lines of sight for more than one target on the other sensor and therefore more than one set of assignments could pass the confidence test. In this case, a means is provided to resolve the ambiguity and make a consistent set of assignments. An extended Munkres algorithm may be particularly advantageous to make assignments that minimize normalized square residuals.

When the covariances become large, the size of the residuals and equivalently the minimum distance between the lines of sight that will pass a confidence test grows increasing the possibility of spurious correlations. For example, at a 5% confidence level, the standardized residual or normalized distance between lines of sight that passes the test is about 1.96. This means that any $D_{jk} < 1.96\sigma_{vjk}$ will pass the confidence test. Thus, $\sigma_{vjk}$ is a good indicator of how close events can be together without causing a spurious correlation.

Consideration of Refraction

The discussion presented so far has assumed that the path of light from the detected event is a straight line. However, if the elevation angle from the event to the sensor is small enough $\Phi<\Phi_c$, where $\Phi_c \approx 20°$, refraction of light through the atmosphere become significant and must be addressed. In the current application, the reported pointing vector $\tilde{p}'_i$ is adjusted in the direction of the horizon to provide a straight line between the sensor and the event $$\tilde{p}'_i = \frac{\tilde{T}' - v_i}{|\tilde{T}' - v_i|} = q^*_{\omega i} \tilde{p}_i q_{\omega i}$$

where $q_{\omega i}$ is quaternion rotation matrix through an angle $\omega_i$ toward the horizon that is a function of the altitude of an assumed location point for the event $\tilde{T}'$ and $\tilde{p}_i$ is the pointing vector actually seen by the sensor. The conditions equations are still functions of the same variables but the expression for $\hat{p}_i(s+1)$ becomes $$\hat{p}_i(s+1) = q^*_{-\omega i} \hat{p}'_i(s+1) q_{-\omega i} = q^*_{-\omega i} \frac{\hat{T}(s+1) - v_i}{|\hat{T}(s+1) - v_i|} q_{-\omega i}$$

Dependencies

Refraction strongly depends on surface temperature, temperature gradient with altitude and atmospheric pressure. Even if the calculation of the bending due to refraction is accurate, these inputs to the calculations are not known. Seasonal and diurnal variations for these inputs can be estimated from historic data bases as a function of latitude and longitude but the residual errors are not yet estimated.

Simulations indicate that the least squares triangulation procedure can accommodate the bending of light due to refraction using numerically calculated A matrix. But the lack of residual error estimation for the refraction calculation prevents assessment of correlation for targets where refraction correction and its residual error are significant for one or both of the paths from the target to sensor.

Temporally Overlapping Observations

When observations overlap in time, generation of test observations at a common time for correlation assessment involves interpolation. A fit used for the interpolation can smooth the random variations and the associated prediction error would replace the random error in the calculation of observation covariance. If there are too few observations from a sensor to obtain a good fit, a raw observation is used in the correlation assessment. If raw observations are used from both sensors, additional error is introduced due to the difference in observation times. However, such additional error may be negligible if the observation frequencies are high enough.

The cases under consideration for temporally overlapping observations include: stationary observation sets from both sensors, moving observation sets from both sensors, and a stationary observation set from one sensor and a moving set from the other sensor.

Results of simulation testing indicate that if there are enough points to generate a fit for both sensors, selection of the center of the observation overlap interval as the common observation time works well for correlation assessment for all three cases. Otherwise, use of the closest observation to the center of the overlap works well if the number of observations is too small for a good fit.

Temporally Separated Observations

There may be several instances where the observation sets from the sensors do not overlap in time: (a) a short stationary target from one sensor followed by a moving target from the other sensor, (b) a moving target from one sensor followed by a short stationary target from the other sensor, and (c) a moving target from one sensor followed by a moving target from the other sensor.

In each case, Kalman filters are used to generate a predicted observation from one sensor at a time for which an observation (e.g., generated with a polynomial fit) is available from the other sensor. The Kalman predicted covariance replaces the random error covariance in the calculation of total covariance for the correlation assessment in one embodiment. For the case of a stationary target followed by a moving target, the Kalman extrapolation is backward in time to a possible initiating event seen by the other sensor. For the case of a moving target followed by a stationary target, the Kalman extrapolation is forward in time to a possible termination event seen by the other sensor. For the case of two moving targets, two extrapolations are performed (one from each sensor to the other) and the resulting confidences are fused to provide a single estimate of the confidence that the observations are from the same physical target.

Linear Kalman Filter Embodiment

Kalman filters implement a recursive least squares approach for estimating the state of a system based on a series of observations. Let $\hat{X}_k$ be the state vector estimate at time $t_k$,
$\hat{P}_k$ be the error covariance matrix estimate at time $t_k$,
$z$ be the vector of observations at time $t_{k+1}$, $$\Phi(t_{k+1}, t_k) = \frac{\partial \hat{X}_{k+1}}{\partial \hat{X}_k}$$

$$H_{k+1} = \frac{\partial z}{\partial \hat{X}_{k+1}}$$

Then the predicted state at time $t_{k+1}$ is $$\overline{X}_{k+1} = \Phi \hat{X}_k$$

The predicted error covariance at time $t_{k+1}$ is $$\overline{P}_{k+1} = \Phi \hat{P}_k \Phi^T + Q$$

where Q is the process noise.

The optimal estimates of the state and covariance given an observation vector, z at time $t_{k+1}$ are $$\hat{X}_{k+1} = \overline{X}_{k+1} + K_{k+1}[z - H_{k+1}\overline{X}_{k+1}]$$

$$\hat{P}_{k+1} = [I - K_{k+1}H_{k+1}]\overline{P}_{k+1}$$

where $$K_{k+1} = \overline{P}_{k+1} H_{k+1}^T [H_{k+1}\overline{P}_{k+1} H_{k+1}^T + R]$$

is the Kalman gain and R is the measurement error.

Application to Observations from Pointing Sensors

In the current embodiment, the pointing observation vectors are expressed in spherical coordinates ($\theta, \phi$). Thus, $z = (\theta, \phi)$. Using a six state Kalman filter, we have $$X = (\theta, \dot\theta, \ddot\theta, \varphi, \dot\varphi, \ddot\varphi,)$$

$$H = \begin{bmatrix} 1 & 0 & 0 & 0 & 0 & 0 \\ 0 & 0 & 0 & 1 & 0 & 0 \end{bmatrix}$$

$$\Phi(t_{k+1}, t_k) = \Phi(\Delta t) = \begin{bmatrix} 1 & \Delta t & \frac{\Delta t^2}{2} & & & \\ 0 & 1 & \Delta t & & 0 & \\ 0 & 0 & 1 & & & \\ & & & 1 & \Delta t & \frac{\Delta t^2}{2} \\ & 0 & & 0 & 1 & \Delta t \\ & & & 0 & 0 & 1 \end{bmatrix}$$

R may be set to the random component of the measurement errors. The Q matrix is typically treated as a set of tuning parameters. However, in the applications of interest target characterization information may be available to help tune Q based on target type.

Here, Δt is the gap in time between the observations for one sensor and those for the other sensor. The calculation of the predicted Kalman covariance has a strong dependence on this gap. The growth of the predicted Kalman covariance with duration of the gap limits practical size of the size of the gap that can be accommodated because large covariance increases the chance of spurious correlations.

Fusion of Confidence

For the case of two moving targets separated in time, two confidences are obtained: one extrapolating from each set of sensor observations to the other. Although statistically correlated, these confidences are not the same. They need to be fused into a single confidence that the observation sets are from the same event. For this application, a gamma probabilistic fusion approach[5] is used. A statistic is defined, in terms of the two confidences, that has a gamma distribution, which is then used to evaluate the fused confidence.

Let N be the number of confidences to be fused (N≥2) and define $$Y_i = -\log(Conf_i)$$

$$S = \sum_{i=1}^{N} Y_i$$

$$C = 2\sum_{i=1}^{N-1}\sum_{j=i+1}^{N} \rho_{ij}$$

where $\rho_{ij}$ is the statistical correlation between $Conf_i$ and $Conf_j$. The gamma shape and scale parameters are $$r = \frac{N^2}{N+C}, \quad \text{(shape)}$$

$$\lambda = \frac{N}{N+C}, \quad \text{(scale)}$$

and the fused confidence is given by $$Conf_f = 1.0 - G(S;r,\lambda)$$

where G is the incomplete gamma function integrated from the left.

In the fusion of the two confidences from extrapolation between the sensor observation sets, the correlation between the confidences, $\rho_{jk}$, is a function of the gap between the observation sets and must be estimated for the particular application.

Implementation Parameters

Several sets of tuning parameters are required to implement multiple pointing sensor correlation. The tuning parameter groups may be:

Polynomial fit control
Kalman filter control
Minimum line of sight intersection distance screen control
Least squares triangulation control, and
Munkres assignment algorithm control Simulation testing has been used to tune these parameters for optimizing performance of the correlation system. Excellent performance is seen for all of the cases described above over a wide set of target profiles and measurement uncertainty regimes. However, final tuning will occur after deployment the sensors because only then will the actual uncertainty regimes be determined. Furthermore, target profiles of interest are likely to evolve over the operational life of the sensors requiring periodic retuning of the parameter sets.

Second Order LOS Intersection Distance Errors

Figure 3:
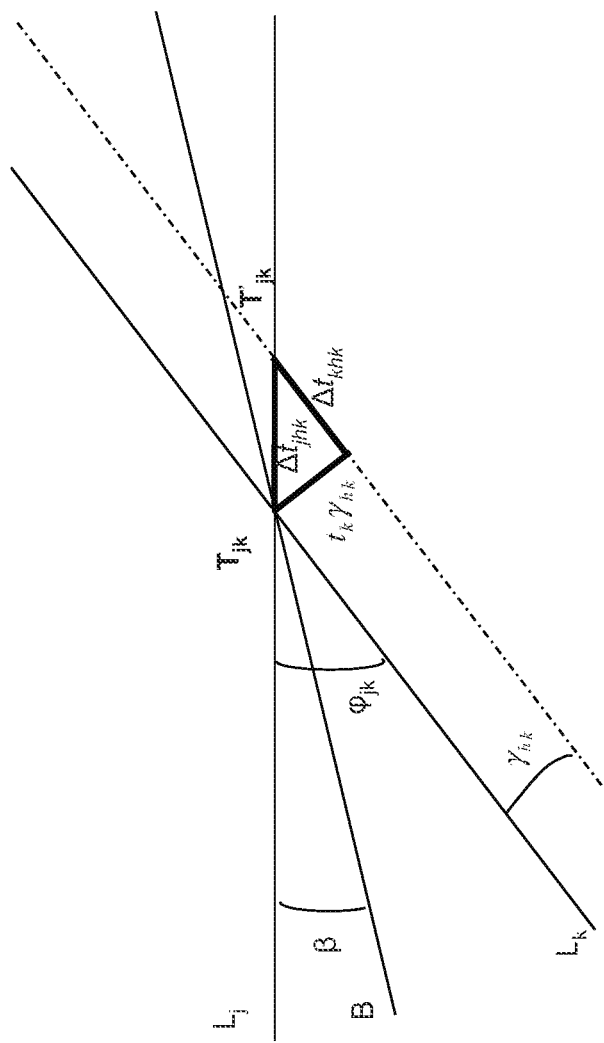
FIG. 3 is an embodiment illustrating that, for very small angular errors, errors in an intersection point in a plane perpendicular to a line of sight can be processed in terms of an angular error for a pointing vector in the epipolar plane, an angular error for a pointing vector in the epipolar plane and an angle between the lines of sight.

Turning to FIG. 3, an embodiment is illustrated showing that, for very small angular errors, the error in the intersection point in the plane perpendicular to $M_{jk}$ can be analyzed as in FIG. 3 in terms of the angular error $\gamma_{hk}$ for $p_k$ in the epipolar plane, the angular error $\gamma_{hj}$ for $p_j$ in the epipolar plane and the angle between the lines of sight $\phi_{jk}$. From the figure, the angular error $\gamma_{hk}$ shifts in the apparent intersection point $T'_{jk}$ and results in errors in the ranges from the sensors:

$$\Delta t_{jhk} = \frac{t_k \gamma_{hk}}{\sin\varphi_{jk}}$$

$$\Delta t_{khk} = \frac{t_k \gamma_{hk}}{\sin\varphi_{jk}}\cos\varphi_{jk} = t_k \gamma_{hk} \cot\varphi_{jk}$$

Similarly, an angular error $\gamma_{hj}$ results in errors:

$$\Delta t_{khj} = \frac{t_j \gamma_{hj}}{\sin\varphi_{kj}} = -\frac{t_j \gamma_{hj}}{\sin\varphi_{jk}}$$

$$\Delta t_{jhj} = \frac{t_j \gamma_{hj}}{\sin\varphi_{kj}}\cos\varphi_{kj} = -\frac{t_j \gamma_{hj}\cos\varphi_{jk}}{\sin\varphi_{jk}} = -t_j \gamma_{hj}\cot\varphi_{jk}$$

Thus $$t_j = t_{jA} - \frac{\cos\varphi_{jk}}{\sin\varphi_{jk}} t_{jA}\gamma_{hj} + \frac{t_{kA}\gamma_{hk}}{\sin\varphi_{jk}}$$

$$t_k = t_{kA} - \frac{t_{jA}\gamma_{hj}}{\sin\varphi_{jk}} + \frac{\cos\varphi_{jk}}{\sin\varphi_{jk}} t_{kA}\gamma_{hk}$$

where $t_{jA}$ and $t_{kA}$ are the actual ranges from the sensors. Therefore, in terms of the ranges from the sensors and the associated errors $D_{jk}$ becomes:

$$D_{jk} = \left| \left( t_{jA} - \frac{\cos\varphi_{jk}}{\sin\varphi_{jk}} t_{jA}\gamma_{hj} + \frac{t_{kA}\gamma_{hk}}{\sin\varphi_{jk}} \right)\gamma_{vj} - \left( t_{kA} - \frac{t_{jA}\gamma_{hj}}{\sin\varphi_{jk}} + \frac{\cos\varphi_{jk}}{\sin\varphi_{jk}} t_{kA}\gamma_{hk} \right)\gamma_{vk} \right|$$

-continued $$D_{jk} = \left| \begin{array}{l} \left( t_{jA} - \dfrac{\cos\varphi_{jk}}{\sin\varphi_{jk}} t_{jA}(\gamma_{aj}\sin\theta_{jk} + \gamma_{bj}\cos\theta_{jk}) + \dfrac{t_{kA}(\gamma_{ak}\sin\theta_{kj} + \gamma_{bk}\cos\theta_{kj})}{\sin\varphi_{jk}} \right) \\ (\gamma_{aj}\cos\theta_{jk} + \gamma_{bj}\sin\theta_{jk}) - \left( t_{kA} - \dfrac{t_{jA}(\gamma_{aj}\sin\theta_{jk} + \gamma_{bj}\cos\theta_{jk})}{\sin\varphi_{jk}} + \right. \\ \left. \dfrac{\cos\varphi_{jk}}{\sin\varphi_{jk}} t_{kA}(\gamma_{ak}\sin\theta_{kj} + \gamma_{bk}\cos\theta_{kj}) \right)(\gamma_{ak}\cos\theta_{kj} + \gamma_{bk}\sin\theta_{kj}) \end{array} \right|$$

It should be noted that when expanded, this takes the form $$D_{jk} = |\gamma^T E + \gamma^T M \gamma|$$

where $$\gamma^T = [\gamma_{aj}, \gamma_{bj}, \gamma_{ak}, \gamma_{bk}],$$

$$E^T = [t_{jA}\cos\theta_{jk}, t_{jA}\sin\theta_{jk}, t_{kA}\cos\theta_{kj}, t_{kA}\sin\theta_{kj}],$$

$$M = \dfrac{1}{\sin\varphi_{jk}} \begin{bmatrix} m_{11} & m_{12} & m_{13} & m_{14} \\ 0 & m_{22} & m_{23} & m_{24} \\ 0 & 0 & m_{33} & m_{34} \\ 0 & 0 & 0 & m_{44} \end{bmatrix}$$

with $m_{11} = -t_{jA}\cos\phi_{jk}\sin\theta_{jk}\cos\theta_{jk},$ $m_{12} = -t_{jA}\cos\phi_{jk},$ $m_{13} = t_{kA}\sin\theta_{kj}\cos\theta_{jk} + t_{jA}\sin\theta_{jk}\cos\theta_{kj},$ $m_{14} = t_{kA}\cos\theta_{kj}\cos\theta_{jk} + t_{jA}\sin\theta_{jk}\sin\theta_{kj},$ $m_{22} = -t_{jA}\cos\phi_{jk}\sin\theta_{jk}\cos\theta_{jk},$ $m_{23} = t_{jA}\cos\theta_{kj}\cos\theta_{jk} + t_{kA}\sin\theta_{jk}\sin\theta_{kj},$ $m_{24} = t_{jA}\sin\theta_{kj}\cos\theta_{jk} + t_{kA}\sin\theta_{jk}\cos\theta_{kj},$ $m_{33} = -t_{kA}\cos\phi_{jk}\sin\theta_{kj}\cos\theta_{kj},$ $m_{34} = -t_{kA}\cos\phi_{jk},$ $m_{44} = -t_{kA}\cos\phi_{jk}\sin\theta_{kj}\cos\theta_{kj}.$ Thus, when the second order terms are small $$\left( i.e. \dfrac{\gamma_{hj}}{\sin\varphi_{jk}} \ll 1 \text{ and } \dfrac{\gamma_{hk}}{\sin\varphi_{jk}} \ll 1 \right)$$

the first order expression for $D_{jk}$ can be used:

$$D_{jk} = |\gamma^T E| = |t_{jA}\gamma_{aj}\cos\theta_{jk} + t_{jA}\gamma_{bj}\sin\theta_{jk} - t_{kA}\gamma_{ak}\cos\theta_{kj} + t_{kA}\gamma_{bk}\sin\theta_{kj}| = |t_{jA}\gamma_{vj} - t_{kA}\gamma_{vk}|$$

In FIG. 3, the line B forms an angle $\beta$ with line of sight $L_j$ in the epipolar plane. The projections of the angular errors onto B are:

$$B_{\parallel hk} = \dfrac{t_k \gamma_{hk}}{\sin\varphi_{jk}} \cos\beta,$$

$$B_{\parallel hj} = -\dfrac{t_j \gamma_{hj}}{\sin\varphi_{jk}} \cos(\beta - \varphi_{jk})$$

Thus, the combination of errors along B is:

$$B_{\parallel} = -\left( \dfrac{\cos(\beta - \varphi_{jk})}{\sin\varphi_{jk}} \right) t_{jA}\gamma_{hj} + \left( \dfrac{\cos\beta}{\sin\varphi_{jk}} \right) t_{kA}\gamma_{hk}$$

$$B_{\parallel} = -\left( \dfrac{\cos(\beta - \varphi_{jk})}{\sin\varphi_{jk}} \right) t_{jA}(\gamma_{aj}\sin\theta_{jk} + \gamma_{bj}\cos\theta_{jk}) + \left( \dfrac{\cos\beta}{\sin\varphi_{jk}} \right) t_{kA}(\gamma_{ak}\sin\theta_{kj} + \gamma_{bj}\cos\theta_{kj})$$

The projections of the angular errors perpendicular to B in the epipolar plane are:

$$B_{\perp hk} = \dfrac{t_k \gamma_{hk}}{\sin\varphi_{jk}} \sin\beta,$$

$$B_{\perp hj} = -\dfrac{t_j \gamma_{hj}}{\sin\varphi_{jk}} \sin(\beta - \varphi_{jk})$$

Thus, the combination of the angular errors perpendicular to B in the epipolar plane are:

$$B_{\perp} = -\left( \dfrac{\sin(\beta - \varphi_{jk})}{\sin\varphi_{jk}} \right) t_{jA}\gamma_{hj} + \left( \dfrac{\sin\beta}{\sin\varphi_{jk}} \right) t_{kA}\gamma_{hk}$$

$$B_{\perp} = -\left( \dfrac{\sin(\beta - \varphi_{jk})}{\sin\varphi_{jk}} \right) t_{jA}(\gamma_{aj}\sin\theta_{jk} + \gamma_{bj}\cos\theta_{jk}) + \left( \dfrac{\sin\beta}{\sin\varphi_{jk}} \right) t_{kA}(\gamma_{ak}\sin\theta_{kj} + \gamma_{bj}\cos\theta_{kj})$$

Now $\beta=0$ corresponds to $L_j$ and results in:

$$B_{\parallel} = -\dfrac{\cos\varphi_{jk}}{\sin\varphi_{jk}} t_j \gamma_{hj} + \dfrac{t_k \gamma_{hk}}{\sin\varphi_{jk}}$$

$$B_{\perp} = t_j \gamma_{hj}$$

It is noted that, for this case, $B_\parallel$ represents the error in $t_j$. Now $\beta=\phi_{jk}$ corresponds to $L_k$ and results in:

$$B_{\parallel} = -\dfrac{t_j \gamma_{hj}}{\sin\varphi_{jk}} + \dfrac{\cos\varphi_{jk}}{\sin\varphi_{jk}} t_k \gamma_{hk}$$

$$B_{\perp} = t_k \gamma_{hk}$$

It is noted that, for this case, $B_\parallel$ represents the error in $t_k$.

Finally, if $t_{jA} \approx t_{kA}$ and $e_j \approx e_k$ then the normal to the epipolar plane, the direction of B for $\beta=\phi_{jk}/2$ and the direction perpendicular to these vectors are the principle axes of the covariance matrix for $T_{jk}$.

3D Tracking

In certain embodiments, a 3D Fusion Trackers have been developed that use an Extended Kalman Filter (EKF) to build three dimensional tracks using both 2D and 3D observations from multiple sensors. Observation sequences from a sensor are associated with existing tracks using gating techniques to determine whether there is an existing track to which the observations should be added. Observation sequences from different sensors may be also associated with each other using gating techniques to determine if they are from the same target. If they are, a new track can be initiated.

When targets are closely spaced, a single sequence from one sensor may pass multiple gates for association with existing tracks or sequences from other sensors. The 3D Fusion Tracker disclosed herein uses a multi-hypothesis approach to maintain each possible track until additional information allows selection of the right track.

Extended Kalman Filter

While Kalman filters are generally known, advantageous embodiments in the present disclosure utilize 9 and 12-state Extended Kalman Filters (EKFs).

In one exemplary embodiment, let $\bar{z}_k$ be the vector of observations at time $t_k$=kT where T is the sample period, $\bar{\eta}_k$ be a vector of zero mean, independent identically distributed white Gaussian measurement noise with covariance R, $\bar{x}_k$ be the state vector at time $t_k$, $\hat{x}_k$ be the state vector estimate at time $t_k$, $\bar{v}_k$ be a vector of zero mean, independent identically distributed white Gaussian process noise with covariance Q, $\hat{P}_k$ be the error covariance matrix estimate at time $t_k$, $\tilde{x}_k$ be the state vector prediction at time $t_k$, and $\tilde{P}_k$ be the error covariance matrix prediction at time $t_k$.

Accordingly, $$z_k = h(\bar{x}_k) + \bar{\eta}_k$$

$$H_k = \frac{\partial h_k}{\partial \hat{x}_k}$$

$$H_k = \frac{\partial h_k}{\partial \hat{x}_k}$$

$$F_k = \frac{\partial \hat{x}_{k+1}}{\partial \hat{x}_k} = \frac{\partial f(\hat{x}_k)}{\partial \hat{x}_k}$$

It is noted that the predicted state at time $t_{k+1}$ for a linear Kalman Filter is $$\tilde{x}_{k+1} = F_k \hat{x}_k$$

Predicted error covariance at time $t_{k+1}$ is $$\tilde{P}_{k+1} = F_k \hat{P}_k F_k^T + Q_k$$

Optimal estimates of the state and covariance given an observation vector, z, at time $t_{k+1}$ are $$\hat{x}_{k+1} = \tilde{x}_{k+1} + K_{k+1} y_{k+1}$$

$$\hat{P}_{k+1} = [I - K_{k+1} H_{k+1}] \tilde{P}_{k+1}$$

$$S_{k+1} = [H_{k+1} \tilde{P}_{k+1} H_{k+1}^T + R_{k+1}]$$

where $$K_{k+1} = \tilde{P}_{k+1} H_{k+1}^T S_{k+1}$$

is the Kalman gain and $$y_{k+1} = [z - H_{k+1} \tilde{x}_{k+1}]$$

is the residual.

The normalized square residual (NSR) is given by $$NSR_{k+1} = [y_{k+1}^T S_{k+1}^{-1} y_{k+1}],$$

which is normally distributed an therefore can be used to estimate the confidence that the observation belongs to the track. Here it assumed in the embodiment that the 2D pointing measurement errors can be characterized by a bias component that is constant over a set of observations and a random component that is different for each observation.

The subsections below describe in greater detail both a 9-state and a 12-state EKF that can be updated with either single 2D observations from the sensors or with 3D triangulations obtained using a least square error procedure to combine observations from multiple sensors.

9 State Kalman Filter

A 9 state filter for a target assumes that the state of the target may be described by its ECI position, velocity and acceleration, which is assumed to be constant over a time step. Random changes in acceleration are the process error over a time step.

The terms in the state transition matrix are assembled from:

$$F_k = \frac{\partial \hat{x}_{k+1}}{\partial \hat{x}_k} = \frac{\partial f(\hat{x}_k)}{\partial \hat{x}_k} = \begin{bmatrix} 1 & t & t^2/2 & 0 & 0 & 0 & 0 & 0 & 0 \\ 0 & 1 & t & 0 & 0 & 0 & 0 & 0 & 0 \\ 0 & 0 & t & 0 & 0 & 0 & 0 & 0 & 0 \\ 0 & 0 & 0 & 1 & t & t^2/2 & 0 & 0 & 0 \\ 0 & 0 & 0 & 0 & 1 & t & 0 & 0 & 0 \\ 0 & 0 & 0 & 0 & 0 & 1 & 0 & 0 & 0 \\ 0 & 0 & 0 & 0 & 0 & 0 & 1 & t & t^2/2 \\ 0 & 0 & 0 & 0 & 0 & 0 & 0 & 1 & t \\ 0 & 0 & 0 & 0 & 0 & 0 & 0 & 0 & 1 \end{bmatrix}$$

where $\hat{x}_k = [x_k \, \dot{x}_k \, \ddot{x}_k \, y_k \, \dot{y}_k \, \ddot{y}_k \, z_k \, \dot{z}_k \, \ddot{z}_k]$.

12 State Kalman Filter

A 12 state filter for a target assumes that the state of the target can be described by its ECI position, velocity, acceleration and jerk (rate of change of acceleration), which is assumed to be constant over a time step. Random changes in jerk are the process error over a time step.

Again, the terms in the state transition matrix are assembled from:

$$F_k = \frac{\partial \hat{x}_{k+1}}{\partial \hat{x}_k} =$$

$$\frac{\partial f(\hat{x}_k)}{\partial \hat{x}_k} = \begin{bmatrix} 1 & t & t^2/2 & t^3/6 & 0 & 0 & 0 & 0 & 0 & 0 & 0 & 0 \\ 0 & 1 & t & t^2/2 & 0 & 0 & 0 & 0 & 0 & 0 & 0 & 0 \\ 0 & 0 & 1 & t & 0 & 0 & 0 & 0 & 0 & 0 & 0 & 0 \\ 0 & 0 & 0 & 1 & 0 & 0 & 0 & 0 & 0 & 0 & 0 & 0 \\ 0 & 0 & 0 & 0 & 1 & t & t^2/2 & t^3/6 & 0 & 0 & 0 & 0 \\ 0 & 0 & 0 & 0 & 0 & 1 & t & t^2/2 & 0 & 0 & 0 & 0 \\ 0 & 0 & 0 & 0 & 0 & 0 & 1 & t & 0 & 0 & 0 & 0 \\ 0 & 0 & 0 & 0 & 0 & 0 & 0 & 1 & 0 & 0 & 0 & 0 \\ 0 & 0 & 0 & 0 & 0 & 0 & 0 & 0 & 1 & t & t^2/2 & t^3/6 \\ 0 & 0 & 0 & 0 & 0 & 0 & 0 & 0 & 0 & 1 & t & t^2/2 \\ 0 & 0 & 0 & 0 & 0 & 0 & 0 & 0 & 0 & 0 & 1 & t \\ 0 & 0 & 0 & 0 & 0 & 0 & 0 & 0 & 0 & 0 & 0 & 1 \end{bmatrix}$$

where $\hat{x}_k = [x_k \, \dot{x}_k \, \ddot{x}_k \, \dddot{x}_k \, y_k \, \dot{y}_k \, \ddot{y}_k \, \dddot{y}_k \, z_k \, \dot{z}_k \, \ddot{z}_k \, \dddot{z}_k]$.

Filter Update with Single 2D Observations

Let p be the pointing vector for a 2D observation. Then $p = x - v$ where x is the current target position and v is the position of the sensor. Expressing the observation in polar coordinates we have $$z = \begin{pmatrix} \theta \\ \phi \end{pmatrix} = \begin{pmatrix} \tan^{-1}\left(\frac{p_y}{p_x}\right) \\ \tan^{-1}\left(\frac{p_z}{(p_x^2 + p_y^2)^{1/2}}\right) \end{pmatrix}$$

Since x is independent of v we have $$H = \frac{\partial h}{\partial x} = \frac{\partial h}{\partial p} = \frac{\partial z}{\partial p}$$

Thus, for a 9-State Kalman Filter we have $$H_k = \begin{bmatrix} \frac{\partial \theta}{\partial p_x} & 0 & 0 & \frac{\partial \theta}{\partial p_y} & 0 & 0 & \frac{\partial \theta}{\partial p_z} & 0 & 0 \\ \frac{\partial \phi}{\partial p_x} & 0 & 0 & \frac{\partial \phi}{\partial p_y} & 0 & 0 & \frac{\partial \phi}{\partial p_z} & 0 & 0 \end{bmatrix}$$

and for a 12-State Kalman Filter we have $$H_k = \begin{bmatrix} \frac{\partial \theta}{\partial p_x} & 0 & 0 & 0 & \frac{\partial \theta}{\partial p_y} & 0 & 0 & 0 & \frac{\partial \theta}{\partial p_z} & 0 & 0 & 0 \\ \frac{\partial \phi}{\partial p_x} & 0 & 0 & 0 & \frac{\partial \phi}{\partial p_y} & 0 & 0 & 0 & \frac{\partial \phi}{\partial p_z} & 0 & 0 & 0 \end{bmatrix}$$

where $$\frac{\partial \theta}{\partial p_x} = -\frac{p_y}{(p_x^2 + p_y^2)^{1/2}}$$

$$\frac{\partial \theta}{\partial p_y} = \frac{p_x}{(p_x^2 + p_y^2)^{1/2}}$$

$$\frac{\partial \theta}{\partial p_z} = 0$$

$$\frac{\partial \phi}{\partial p_x} = -\frac{p_x p_z}{(p_x^2 + p_y^2)^{1/2}(p_x^2 + p_y^2 + p_z^2)}$$

$$\frac{\partial \phi}{\partial p_y} = -\frac{p_y p_z}{(p_x^2 + p_y^2)^{1/2}(p_x^2 + p_y^2 + p_z^2)}$$

$$\frac{\partial \phi}{\partial p_z} = \frac{(p_x^2 + p_y^2)^{1/2}}{(p_x^2 + p_y^2 + p_z^2)}$$

$$\frac{\partial h_{k,i}}{\partial x_{k,i}} = 1$$

$$\frac{\partial h_{k,i}}{\partial \dot{x}_{k,i}} = 0$$

$$\frac{\partial h_{k,i}}{\partial \ddot{x}_{k,i}} = 0$$

$$\frac{\partial h_{k,i}}{\partial \dddot{x}_{k,i}} = 0$$

where i is one of x, y, z.

Thus for a 9 State Kalman Filter it can be seen that $$H_k = \begin{bmatrix} 1 & 0 & 0 & 0 & 0 & 0 & 0 & 0 & 0 \\ 0 & 0 & 0 & 1 & 0 & 0 & 0 & 0 & 0 \\ 0 & 0 & 0 & 0 & 0 & 0 & 1 & 0 & 0 \end{bmatrix}.$$

For a 12 State Kalman Filter it can be seen that $$H_k = \begin{bmatrix} 1 & 0 & 0 & 0 & 0 & 0 & 0 & 0 & 0 & 0 & 0 & 0 \\ 0 & 0 & 0 & 0 & 1 & 0 & 0 & 0 & 0 & 0 & 0 & 0 \\ 0 & 0 & 0 & 0 & 0 & 0 & 0 & 0 & 1 & 0 & 0 & 0 \end{bmatrix}.$$

Synthesized Observations From Fit

Simple 2 degree polynomial fits may be advantageously used to interpolate 2D observations in order to synthesize observations from multiple sensors at a common time. An adaptive fit window may be defined by
  requiring a minimum number of points,
  setting a maximum number of points,
  setting a maximum fit time A windowing scheme may attempt to select points centered about the time of the synthesized point. However, this will not be possible if the time of interest is near an end of the observation set. The random error component for the synthesized point is replaced by the fit error. An observation frequency for the synthesized points is also specified. When many points are synthesized from observation from the same two sensors, it was found the Kalman filter is blind to the constant bias errors and converged more quickly if the measurement error was set only to the fit error without the bias component.

Weighted Least Squares for Triangulation

Weighted least squares approaches have been found to be advantageous in multiple-image data point triangulation. In this section of the disclosure, a summary of the weighted least squares formulation is provided followed by application to the triangulation points for multiple sensors seeing the same.

Weighted Least Squares Formulation

Assuming
$$l = \tilde{l} + e,$$

where l is a vector of n unperturbed observations, e is a vector of a priori unknown residuals and the actual observations $\tilde{l}$ are normally distributed observations with $$\tilde{l} \sim N(\bar{l}, \Sigma_{ll}),$$

where $\bar{l}$ is the mean of the distribution and $\Sigma_{ll}$ denotes the covariance matrix. Let x be a vector of u model parameters. The maximum likelihood estimators for model parameters are found by solving the nonlinear equality constrained problem $$\text{minimize}[\Theta = e^T Q_{ll}^{-1} e] \text{ subject to } f(x,l)=0$$

where $Q_{ll}$ is the cofactor matrix found from normalization $\Sigma_{ll} = \sigma_0^2 Q_{ll}$ and $\sigma_0^2$ is the a priori standard deviation of a unit weight observation. The inverted cofactor matrix can be interpreted as a weight matrix. Linearization of the problem allows an iterative solution given an initial guess of the model parameters $\hat{x}(0)$ and with a first estimate $\hat{l}(0) = \tilde{l}$ for the unperturbed observations. The iteration is stopped if the improvement $\Delta \hat{x}(s) = \hat{x}(s+1) - \hat{x}(s)$ at step s is smaller than a specified threshold. The estimates for the unperturbed observations are updated at each step by $\Delta \hat{l}(s) = \hat{l}(s+1) - \hat{l}(s)$. When stopping the iteration at step s*, the final estimates of the unknowns are $\hat{I}(s*+1)$ and $\hat{x}(s*+1)$. A final estimate for the residuals e is obtained through $e=\hat{I}(s*+1)-\tilde{I}$.

A linearized form of the constraint functions is $$A\Delta x + B\Delta l + w = 0,$$

where $A=\partial f/\partial x$ is an r×u matrix and $B=\partial f/\partial l$ is an r×n and $w=-f(\hat{x}(s),\hat{I}(s))$ is a vector of r function residuals.

The solutions for $\hat{\Delta x}$ and $\hat{\Delta I}$ are $$\hat{\Delta x} = (A^T Q_{ww}^{-1} A)^{-1} A^T Q_{ww}^{-1} w,$$

and $$\hat{\Delta I} = Q_{ll} B^T Q_{ww}^{-1} (-A(A^T Q_{ww}^{-1} A)^{-1} A^T Q_{ww}^{-1}) w,$$

where $Q_{ww} = BQ_{ll}B^T$ simplifies the notation and can be interpreted as the cofactor matrix of the function residuals. The cofactors $Q_{ww}$ can be converted to covariances $\Sigma ww$ by multiplying $Q_{ww}$ with $$\hat{\sigma}_0^2 = \frac{\hat{e}^T Q_{ll}^{-1} \hat{e}}{v},$$

where v is the number of degrees of freedom of the estimation problem. If the data and the model agree, $\hat{\sigma}_0^2$ is an unbiased estimator of $\sigma_0^2$. It is noted that multiplying $Q_{ww}$ with $\sigma_0^2$ instead of $\hat{\sigma}_0^2$ results in a priori covariances. Thus, the solutions for $\hat{\Delta x}$ and $\hat{\Delta I}$ can be written $$\hat{\Delta x} = (A^T \Sigma_{ww}^{-1} A)^{-1} A^T \Sigma_{ww}^{-1} w,$$

and $$\hat{\Delta I} = \Sigma_{ll} B^T \Sigma_{ww}^{-1} (-A(A^T \Sigma_{ww}^{-1} A)^{-1} A^T \Sigma_{ww}^{-1}) w,$$

where $\Sigma ww = B\Sigma llB^T$ again simplifies the notation and can be interpreted as the a priori covariance matrix of the function residuals. In practice, $\hat{I}(s+1)$ can often be calculated from a sensor model using the new value $\hat{x}(s+1)$, removing the need to use the approximate $\hat{\Delta I}$ above.

Propagation of the cofactors of the function residuals into the spaces of the unknowns yields:

$$Q_{\hat{\Delta x} \hat{\Delta x}} = (A^T Q_{ww}^{-1} A)^{-1} = (A^T (BQ_{ll}B^T)^{-1} A)^{-1},$$

and $$Q_{\hat{\Delta I} \hat{\Delta I}} = Q_{ll} B^T Q_{ww}^{-1} B Q_{ll} - Q_{ll} B^T Q_{ww}^{-1} A(A^T Q_{ww}^{-1} A)^{-1} A^T Q_{ww}^{-1} B Q_{ll}.$$

Now $$Q_{\hat{x}\hat{x}} \approx Q_{\hat{\Delta x}\hat{\Delta x}} \text{ and } Q_{\hat{e}\hat{e}} \approx Q_{\hat{\Delta I}\hat{\Delta I}}.$$

The covariances are obtained by multiplying by $\sigma_0^2$ or $\hat{\sigma}_0^2$. So the a priori covariances are $$\sum_{\hat{x}\hat{x}} = \left(A^T \sum_{ww}^{-1} A\right)^{-1} = \left(A^T \left(B \sum_{ll} B^T\right)^{-1} A\right)^{-1},$$

and $$\sum_{\hat{e}\hat{e}} = \sum_{ll} B^T \sum_{ww}^{-1} B \sum_{ll} - \sum_{ll} B^T \sum_{ww}^{-1} A\left(A^T \sum_{ww}^{-1} A\right)^{-1} A^T \sum_{ww}^{-1} B \Sigma$$

$$\sum_{\hat{e}\hat{e}} = \sum_{ll} B^T \sum_{ww}^{-1} B \sum_{ll} - \sum_{ll} B^T \sum_{ww}^{-1} A \Sigma_{\hat{x}\hat{x}} A^T \sum_{ww}^{-1} B \sum_{ll}.$$

The standardized residual for use in test statistics is $$\bar{e}_i = \frac{\hat{e}_i}{\sqrt{\sum_{\hat{e}\hat{e}ii}}} \sim N(0,1).$$

Where $$\sum_{\hat{e}\hat{e}ii}$$

is the $i^{th}$ diagonal element of $$\sum_{\hat{e}\hat{e}}.$$

It may be assumed that the standardized residuals are distributed normally.

Application to Events Seen by Multiple Pointing Sensors

In the current embodiment, the data associated with a line of sight Li are sensor position $v_i$, sensor pointing vector $p_i$, and $e_i$. The 2D error ellipse perpendicular to the pointing vector is expressed in terms of major axis $a_i$, minor axis $b_i$, and orientation angle $\theta_i$. This allows a simple formulation of the weighted least square approach to find the triangulation point (x≡T) in terms of these measurements that form m sensors minimizes $$\Theta = e^T Q_{ll}^{-1} e = \sigma_0^2 e^T \sum_{ll}^{-1} e = \sigma_0^2 \sum_i \left(\left(\frac{\gamma_{ai}}{a_i}\right)^2 + \left(\frac{\gamma_{bi}}{b_i}\right)^2\right)$$

where $\gamma_{ai}$ is the angular error in the $a_i$ direction for sensor i, $\gamma_{bi}$ is the angular error in the $b_i$ direction for sensor i and $$\sum_{ll} = \begin{bmatrix} a_1^2 & 0 & \ldots & 0 & 0 \\ 0 & b_1^2 & \ldots & 0 & 0 \\ \ldots & \ldots & \ldots & \ldots & \ldots \\ 0 & 0 & \ldots & a_m^2 & 0 \\ 0 & 0 & \ldots & 0 & b_m^2 \end{bmatrix}$$

is the 2m×2m covariance matrix. Then there are two condition equations for each sensor:

$$F_{ai} = \gamma_{ai} = g_{ai}(v_i, p_i, e_i, T) = 0$$

$$F_{bi} = \gamma_{bi} = g_{bi}(v_i, p_i, e_i, T) = 0$$

where $g_{ai}$ calculates $\gamma_{ai}$ using $v_i, p_i, e_i$ and an estimate of the triangulation point, T, and $g_{bi}$ calculates $\gamma_{ai}$ using $v_i, p_i, e_i$ and an estimate of T.

Now $$\hat{p}_i - \tilde{p}_i = \hat{\gamma}_{ai} u_{ai} + \hat{\gamma}_{bi} u_{bi}$$

where $u_{ai}$ and $u_{bi}$ are the unit vectors in the directions of the $a_i$ and $b_i$ axes of $e_i$. So the condition functions can be determined from $$g_{ai}(v_i, p_i, e_i, T) = g_{ai}(v_i, \tilde{p}_i, \gamma_{ai}, \gamma_{bi}, e_i, T)$$

$$g_{bi}(v_i, p_i, e_i, T) = g_{bi}(v_i, \tilde{p}_i, \gamma_{ai}, \gamma_{bi}, e_i, T)$$

Leading to the identification $$l \equiv \begin{bmatrix} \gamma_{a1} \\ \gamma_{b1} \\ \cdots \\ \cdots \\ \gamma_{am} \\ \gamma_{bm} \end{bmatrix}$$

and $$B = \frac{\partial f}{\partial l} = \begin{bmatrix} \frac{\partial f_1}{\partial l_1} & \cdots & 0 \\ \cdots & \cdots & \cdots \\ 0 & \cdots & \frac{\partial f_m}{\partial l_m} \end{bmatrix}$$

where $$\frac{\partial f_i}{\partial l_i} = \begin{bmatrix} \frac{\partial g_{ai}}{\partial \gamma_{ai}} & \frac{\partial g_{ai}}{\partial \gamma_{bi}} \\ \frac{\partial g_{bi}}{\partial \gamma_{ai}} & \frac{\partial g_{bi}}{\partial \gamma_{bi}} \end{bmatrix}.$$

Since $g_{ai}$ calculates the current $\gamma_{ai}$ and $g_{bi}$ calculates the current $\gamma_{bi}$, which are assumed to be independent errors $\partial f_i / \partial l_i$, should be the identity matrix $$\frac{\partial f_i}{\partial l_i} \approx \begin{bmatrix} 1 & 0 \\ 0 & 1 \end{bmatrix}.$$

Now $x \equiv T$ so $$A = \frac{\partial f}{\partial x} = \begin{bmatrix} \frac{\partial g_{a1}}{\partial T_x} & \frac{\partial g_{a1}}{\partial T_y} & \frac{\partial g_{a1}}{\partial T_z} \\ \frac{\partial g_{b1}}{\partial T_x} & \frac{\partial g_{b1}}{\partial T_y} & \frac{\partial g_{b1}}{\partial T_z} \\ \cdots & \cdots & \cdots \\ \cdots & \cdots & \cdots \\ \frac{\partial g_{am}}{\partial T_x} & \frac{\partial g_{am}}{\partial T_y} & \frac{\partial g_{am}}{\partial T_z} \\ \frac{\partial g_{bm}}{\partial T_x} & \frac{\partial g_{bm}}{\partial T_y} & \frac{\partial g_{bm}}{\partial T_z} \end{bmatrix}$$

Finally $$w = -f = \begin{bmatrix} -F_{a1} \\ -F_{b1} \\ \cdots \\ \cdots \\ -F_{am} \\ -F_{bm} \end{bmatrix}.$$

At each iteration step, s, the current value of $p_i$ and the new value of T are used to calculate $\gamma_{ai}$ and $\gamma_{bi}$. The angle between the new and previous $p_i$ is the current angular error and is projected onto the $a_i$ and $b_i$ axes of the error ellipse to obtain $\gamma_{ai}$ and $\gamma_{bi}$. The new pointing vector at the next step can be found from $$\hat{T}(s+1) = v_i + \hat{t}(s+1)\hat{p}_i(s+1)$$

giving $$\hat{p}_i(s+1) = \frac{\hat{T}(s+1) - v_i}{|\hat{T}(s+1) - v_i|}$$

Now, $$\hat{p}_i(s+1) \cdot \hat{p}_i(s) = \cos \hat{\gamma}_i(s+1)$$

$$\hat{\gamma}_i(s+1) = \cos^{-1}(\hat{p}_i(s+1) \cdot \hat{p}_i(s))$$

where $\hat{\gamma}_i$ is an estimate of the angular error for the current $\hat{T}$. Define $$\hat{u}_{yi}(s+1) = \frac{\hat{p}_i(s+1) - \hat{p}_i(s)}{|\hat{p}_i(s+1) - \hat{p}_i(s)|}$$

$$\hat{\rho}_i(s+1) = \cos^{-1}(\hat{u}_{yi}(s+1) \cdot u_{ai})$$

where $\hat{u}_{yi}$ is the unit vector in the direction of $\hat{\gamma}_i$, $u_{ai}$ is the unit vector in the direction of major axis of the error ellipse $e_i$, and $\hat{\rho}_i$ is the angle between $\hat{\gamma}_i$ and the major axis of the error ellipse. Then $$F_{a_i}(s+1) = \hat{\gamma}_{ai}(s+1) - \hat{\gamma}_i(s+1)\cos \rho_i(s+1)$$

$$F_{b_i}(s+1) = \hat{\gamma}_{bi}(s+1) - \hat{\gamma}_i(s+1)\sin \rho_i(s+1)$$

Recall that after the final iteration the final residuals are $$e = \hat{l}(s^*+1) - \tilde{l}.$$

As before $$\hat{p}_i(s^*+1) \cdot \tilde{p}_i = \cos \overset{+}{\gamma}_{i\,i}$$

$$\overset{+}{\gamma}_i = \cos^{-1}(\hat{p}_i(s^*+1) \cdot \tilde{p}_i)$$

where $\overset{+}{\gamma}_{i\,i}$ is an estimate of the angular error for the final estimate of the triangulation point $\acute{T}$.. (U) Define $$\overset{+}{u}_{yi} = \frac{\hat{p}_i(s^*+1) - \tilde{p}_i}{|\hat{p}_i(s^*+1) - \tilde{p}_i|}$$

$$\overset{+}{\rho}_i = \cos^{-1}(\acute{u}_{yi} \cdot u_{ai})$$

where $\overset{+}{u}_{i\,i}$ is the unit vector in the direction of $\overset{+}{\gamma}_{i\,i}$, and $\overset{+}{\rho}_{i\,i}$ is the angle between $\overset{+}{\gamma}_{i\,i}$ and the major axis of the error ellipse. Then $$\overset{+}{\gamma}_{ai} = \overset{+}{\gamma}_i \cos\overset{+}{\rho}_i$$
$$\overset{+}{\gamma}_{bi} = \overset{+}{\gamma}_i \sin\overset{+}{\rho}_i$$

The standardized residuals are $$\bar{\gamma}_{ai} = \frac{\overset{+}{\gamma}_{ai}}{\sqrt{\sum \bar{e}\bar{e}_{ai}}} \sim N(0,1)$$

$$\bar{\gamma}_{bi} = \frac{\overset{+}{\gamma}_{bi}}{\sqrt{\sum \bar{e}\bar{e}_{bi}}} \sim N(0,1)$$

The standardized residuals can be used as gates to perform preliminary association of observations from different 2D sensors.

Figure 4:
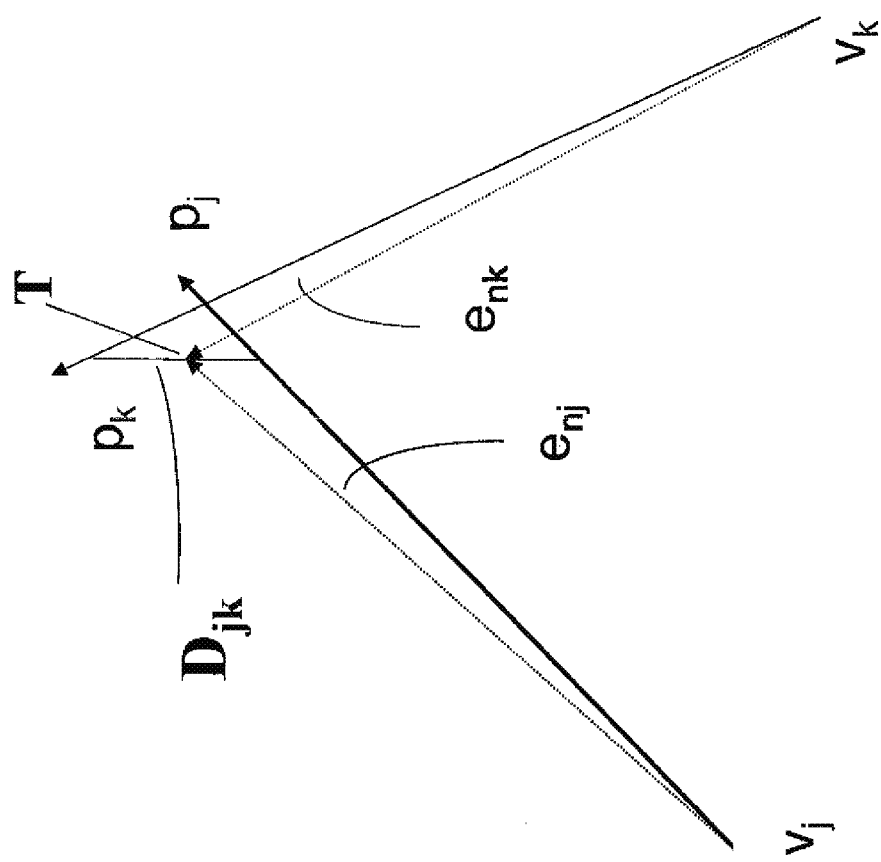
FIG. 4 illustrates an embodiment for a geometry for associating 2D tracks to establish a confidence that observations are consistent with being caused by the same source utilizing shortest distance between lines of sight, angular error, range from sensor to target, target position, sensor pointing vector, and sensor position vector.

Association of 2D Tracks from Different Sensors 2D tracks for pointing sensor provide no range information and therefore must be associated with another 2D track from another sensor to determine where the lines of sight intersect. This intersection can provide an estimate of the position of the observation source position. Pointing errors cause the lines of sight to miss intersection. The miss distance can be converted into a confidence that the observations are consistent with being caused by the same source. FIG. 4 illustrates an exemplary general geometry under one embodiment. Here, $D_{jk}$ is shortest distance between lines of sight, $e_{ni}$ is angular error, $t_i$ is range from sensor to target, T is target position, $p_i$ is sensor pointing vector, $v_i$ is sensor position vector. For small angular errors, we have:

$$D_{jk} = |t_j e_{nj} - t_k e_{nk}|$$

Letting $$\sigma_{D_{jk}}^2 = (t_j \sigma_{nj})^2 + (t_k \sigma_{nk})^2$$

$$e_{ni} \sim N(0, \sigma_{ni}^2)$$

where $\sigma_{ni}$ is projection of error ellipse onto line between lines of sight. Then the normalized distance between the line of sight is $$\tilde{D}_{jk} = D_{jk} / \sigma_{D_{jk}} \sim |N(0,1)|$$

This normalized distance allows a first order confidence based assessment of whether the two lines of sight are from the same source. This is used as a preliminary screen for association of the observations (FIG. 4). The final assessment of association is based on the standardized residual of the triangulation of the two lines of sight to find the target position.

Track Initiation and Extension

Observation sequences from sensors are considered in one embodiment for track initiation when they have at least a user specified number of observations (e.g., 5-10) or a user specified duration (e.g., 4-8 seconds). 3D observation sequences are used directly to initiate a 3D track with the EKF.

A 2D sequence is checked for association with 2D sequences from different sensors that overlap in time with it. If the time overlap is short, the association calculation is performed for the midpoint time of the overlap. If the overlap is long enough (a user specified duration), the association calculation is performed twice: at 0.1 of the overlap and at 0.9 of the overlap. The confidence values are then fused to make the determination of association. Since the observations from different sensors are not synchronized, fits are used to synthesize observations at the time of the association evaluations.

A 3D track hypothesis is initiated for each pair of observation sequences that pass the association test. To initiate a track from associated 2D sequences, a sequence of 3D points is synthesized by triangulation of 2D observations synthesized using fits of the 2D observation sequences from the different sensors. The frequency of synthesized 3D observations and the length of the track initiation sequence are user specified. Pruning methods for eliminating 3D track hypotheses are described in further detail below.

After track initiation, the track can be extended using the 2D observations from the individual sensors one at a time or by continuing the triangulation scheme used to initiate the track. Normally, for the sensors of current interest, the triangulation approach to extending the track leads to smaller velocity and position errors in the estimated track. This is due to the fact that the fitting of observation sequences to synthesize points from the sensors at a common time replaces the random portion of the pointing errors with the smaller fit error.

Association of 2D and 3D Tracks to 3D Fusion Tracks

A track sequences from a sensor can be associated with an existing 3D fusion track if the 3D fusion track does not yet have a contributing track sequence from that sensor. This association is accessed using the normalized square residual of a 2D or 3D observation when adding it to the EKF for the 3D fusion track. Each passing 3D Fusion track is branched into two track hypotheses—one with the sequence observations added and one without.

When there are three 2D sensors that see a target, association calculations can generate track hypotheses for the three possible pairs of sensors and the branch 3D track that contains all three 2D tracks. Logic is used to identify this case and keep only the 3D track that incorporates all three 2D tracks.

Closely Spaced Objects

Closely spaced objects may present challenges to a 3D fusion tracker. The input tracks from individual sensors may pass association gates for multiple tracks from the other sensors and selecting the right association can be difficult. For example, two targets of the same type may stay close together for an extended time so that the gating calculations cannot reveal which of the associations are correct. Furthermore, resolution differences may cause one sensor to not be able to resolve two targets into separate tracks, while another sensor reports two tracks. Similarly, geometry may cause one sensor to resolve multiple targets into separate tracks well after another similar sensor is able to resolve them.

Intermittent Detection

Tracking may be affected by the sensitivity of contributing sensors. The delectability of the target varies over the track and a sensor's ability to detect the target may be intermittent or very different from that of other contributing sensors. This can lead to disconnected track fragments from contributing sensors or time gaps in the reported observations for a single track. The fusion tracker should be able to deal with various combinations of these situations.

When two 2D sensors are contributing to a 3D track and one of them has a gap in detections, updates of the track are due to the other sensor's observations which provide no range information. The 3D track estimate can accumulate large errors along the line of sight of the contributing sensor. When the other sensor starts adding observation again, the 3D track estimate can require a large correction which can make the track estimate experience a large error transient as it re-stabilizes.

Likelihood Pruning

Multi-hypothesis tracking may be employed for single sensor tracks. In the case of single sensors, the bias is the same for each track hypothesis and therefore does not affect the scoring of the hypotheses using likelihood arguments. In the case of multiple sensor miss-associations, the difference in the scores for one candidate association and another cannot be isolated from the bias. The low score for one hypothesis may be due to its non-physical nature or the fact that the bias errors work against it.

Bias Consistency Pruning

If boresites for the sensors are small enough, then it would be expected that the net bias error effect on the line of site miss distance would be the same for all targets seen by both sensors in the overlapping area of their boresites. In this case, one can invoke a bias consistency technique. The miss distance would be distributed about the constant net bias error according to a variance that reflects the variance in the zero sum net random errors. In tests, it was found that if there are only a few closely spaced targets among a large number of targets in the overlapping boresites, outliers could be reliably rejected as false associations if their miss distance was not consistent with a distribution about the mean miss distance due to the random errors. However, if there are a large percentage of closely spaced objects or the random errors are large with respect to the bias errors, outlier selection is not reliable and the mean miss distance due to net bias errors cannot be determined.

Track Feature Assessment

Feature based classification may be advantageous in target recognition applications and can play a role the pruning of track hypotheses in 3D track fusion applications. For example, maximum acceleration and velocity might be specified by target type, and miss-association of 2D tracks from different sensors can lead to negative calculated altitudes, which can be rejected.

3D Fusion Tracker Process Flow

After initialization, the basic flow for the 3D Fusion Tracker is illustrated in the exemplary embodiment of FIG. 5 and comprises the following nested loop:
1) Loop processing sensor observation sets (600)
   a) Wait for next observation set (601)
   b) Sort new observations by time (601)
   c) Loop processing single observations (602)
      i) Get next observation (603)
      ii) Initiate tracks from ready observation sequences (604)
      iii) Associate sequences of observations with existing 3D tracks (605)
      iv) Add observation to all track branches that it is associated with (606)
      v) Prune track hypotheses (607)
      vi) Go to top of loop
   d) Report current tracks (608)
   e) Terminate stale tracks (609)
   f) Go to top of loop Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

It can also be seen that various features are grouped together in individual embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A processor-based method for tracking at least one object utilizing a plurality of sensors, the processor-based method comprising:
   receiving a series of observation data relative to the at least one object over a time base for each of the plurality of sensors, the observation data comprising sensor position data, pointing vector data and observation error data;

determining a triangulation point in a processor using a magnitude ($D_{jk}$) of a shortest line connecting a line of sight value ($M_{jk}$) from each of the series of observation data from each of the plurality of sensors to the at least one object; and performing correlation processing on the observation data and triangulation point in the processor to determine if at least two of the plurality of sensors are tracking the same object.

2. The processor-based method of claim 1, wherein the magnitude is determined from a measure of observation error data perpendicular to the line of sight.

3. The processor-based method of claim 1, wherein the magnitude is determined from an approximation of angular errors ($\gamma_{aj}, \gamma_{bj}$) of the observation data perpendicular to an epipolar plane.

4. The processor-based method of claim 1, wherein determining the triangulation point comprises weighted least squares triangulation.

5. The processor-based method of claim 4, further comprising the step of generating a confidence value that the same object is being tracked, wherein the confidence value is derived from one or more standardized residuals from the weighted least squares triangulation.

6. The processor-based method of claim 1, wherein the correlation processing comprises normalizing each line of sight value.

7. The processor-based method of claim 6, wherein the correlation processing further comprises an iteration of least squares triangulation for each normalized line of sight value.

8. The processor-based method of claim 1, further comprising the step of applying a polynomial fit to at least some of the series of observation data occurring at a common time along the time base.

9. The processor-based method of claim 1, wherein determining the triangulation point comprises the step of applying a fit to smooth at least some of the series of observation data occurring at a common time base to reduce error in velocity estimation.

10. A system for tracking at least one object, the system comprising:

a plurality of pointing sensors; and a tracking system, operatively coupled to the plurality of pointing sensors, wherein the tracking system is configured to receive a series of observation data relative to the at least one object over a time base for each of the plurality of pointing sensors, the observation data comprising sensor position data, pointing vector data and observation error data, the tracking system being further configured to determine a triangulation point using a magnitude ($D_{jk}$) of a shortest line connecting a line of sight value ($M_{jk}$) from each of the series of observation data from each of the plurality of sensors to the at least one object, and perform correlation processing on the observation data and triangulation point to determine if at least two of the plurality of sensors are tracking the same object.

11. The system of claim 10, wherein the tracking system is configured to determine the magnitude from a measure of observation error data perpendicular to the line of sight.

12. The system of claim 10, wherein the tracking system is configured to determine the magnitude from an approximation of angular errors ($\gamma_{aj}, \gamma_{bj}$) of the observation data perpendicular to an epipolar plane.

13. The system of claim 10, wherein the triangulation point is determined at least in part from weighted least squares triangulation.

14. The system of claim 13, wherein the tracking system is configured to generate a confidence value that the same object is being tracked, wherein the confidence value is derived from one or more standardized residuals from the weighted least squares triangulation.

15. The system of claim 10, wherein the system is configured to perform correlation processing comprising normalization of each line of sight value.

16. The system of claim 15, wherein the correlation processing further comprises an iteration of least squares triangulation for each normalized line of sight value.

17. The system of claim 10, wherein the tracking system is further configured to apply a polynomial fit to at least some of the series of observation data occurring at a common time along the time base.

18. The system of claim 10, wherein the tracking system is further configured to determine the triangulation point by applying a fit to smooth at least some of the series of observation data occurring at a common time base to reduce error in velocity estimation.

* * * * *